(12) United States Patent
Tang et al.

(10) Patent No.: US 11,147,076 B2
(45) Date of Patent: Oct. 12, 2021

(54) INFORMATION INDICATION METHOD, NETWORK DEVICE, AND TERMINAL DEVICE

(71) Applicant: HUAWEI TECHNOLOGIES CO., LTD, Shenzhen (CN)

(72) Inventors: Xiaoyong Tang, Shenzhen (CN); Xiaona Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 16/504,260

(22) Filed: Jul. 6, 2019

(65) Prior Publication Data
US 2019/0335474 A1    Oct. 31, 2019

Related U.S. Application Data

(63) Continuation of application No. PCT/CN2017/107137, filed on Oct. 20, 2017.

(30) Foreign Application Priority Data

Jan. 6, 2017    (CN) .......................... 201710010696.X
Mar. 24, 2017   (CN) .......................... 201710184932.X

(51) Int. Cl.
*H04W 72/08*    (2009.01)
*H04L 5/00*     (2006.01)
*H04W 72/04*    (2009.01)

(52) U.S. Cl.
CPC ........... *H04W 72/082* (2013.01); *H04L 5/005* (2013.01); *H04L 5/0057* (2013.01);
(Continued)

(58) Field of Classification Search
CPC ..... H04L 5/0037; H04L 5/005; H04L 5/0053; H04L 5/0057; H04W 72/0413;
(Continued)

(56) References Cited

U.S. PATENT DOCUMENTS

2012/0287875 A1* 11/2012 Kim ...................... H04W 76/27
                                                          370/329
2013/0343303 A1    12/2013 Kim et al.
(Continued)

FOREIGN PATENT DOCUMENTS

CN    103188796 A    7/2013
CN    103297153 A    9/2013
(Continued)

OTHER PUBLICATIONS

Huawei et al: "General framework and principles for configuration of CSI-RS based received signal quality measurement", 3GPP Draft; R2-122135, vol. RAN WG2, No. Prague, Czech Republic; May 21, 2012-May 25, 2012, May 15, 2012, XP05060714, 6 pages.
(Continued)

*Primary Examiner* — Michael Thier
*Assistant Examiner* — Prince A Mensah
(74) *Attorney, Agent, or Firm* — Hauptman Ham, LLP

(57) ABSTRACT

This application discloses an information sending method. The method includes: generating, by a network device, control information, where the control information includes first indication information, second indication information, and third indication information, the first indication information is used to indicate a plurality of channel state information-reference signal CSI-RS resources, the second indication information is used to indicate at least one piece of the following information: beam index information of the plurality of CSI-RS resources that is sent by the network device, beam index information of the plurality of CSI-RS resources that is received by a terminal device, or beam pair information corresponding to the network device and the terminal, and the third indication information is used to indicate a measurement method of the plurality of CSI-RS
(Continued)

resources; and sending, by the network device, the control information to the terminal device.

20 Claims, 8 Drawing Sheets

(52) U.S. Cl.
 CPC ....... *H04W 72/046* (2013.01); *H04W 72/048* (2013.01); *H04W 72/0413* (2013.01)
(58) Field of Classification Search
 CPC .............. H04W 72/042; H04W 72/046; H04W 72/0408; H04W 72/048
 See application file for complete search history.

(56) References Cited

U.S. PATENT DOCUMENTS

| | | | |
|---|---|---|---|
| 2014/0044040 A1 | 2/2014 | Chen et al. | |
| 2014/0226509 A1 | 8/2014 | Ko et al. | |
| 2014/0315563 A1* | 10/2014 | Guo | H04L 5/0057 455/450 |
| 2015/0029966 A1* | 1/2015 | Park | H04L 5/0053 370/329 |
| 2015/0146558 A1 | 5/2015 | Yi et al. | |
| 2015/0358060 A1* | 12/2015 | Park | H04L 1/06 370/329 |
| 2016/0006547 A1 | 1/2016 | Kang et al. | |
| 2016/0119097 A1 | 4/2016 | Nam et al. | |
| 2016/0142189 A1 | 5/2016 | Shin et al. | |
| 2017/0141832 A1* | 5/2017 | Ji | H04W 24/08 |
| 2018/0091272 A1* | 3/2018 | Wang | H04B 7/0626 |
| 2019/0081672 A1* | 3/2019 | Hwang | H04B 7/0486 |

FOREIGN PATENT DOCUMENTS

| | | |
|---|---|---|
| CN | 103326976 A | 9/2013 |
| CN | 103391174 A | 11/2013 |
| CN | 104106223 A | 10/2014 |
| CN | 104541540 A | 4/2015 |
| CN | 104584476 A | 4/2015 |
| CN | 104770039 A | 7/2015 |
| CN | 104956604 A | 9/2015 |
| CN | 105144612 A | 12/2015 |
| CN | 105634574 A | 6/2016 |
| CN | 105812035 A | 7/2016 |
| CN | 106160807 A | 11/2016 |
| CN | 106160828 A | 11/2016 |
| CN | 106209194 A | 12/2016 |
| WO | 2011050643 A1 | 5/2011 |
| WO | 2014027824 A1 | 2/2014 |
| WO | 2016159621 A1 | 10/2016 |

OTHER PUBLICATIONS

LG Electronics: "Discussion on transmit beam coordination and QCL for NR", 3GPP Draft; R1-166903, vol. RAN wGI, No. Gothenburg, Sweden, Aug. 22, 2016-Aug. 26, 2016, Aug. 21, 2016, XP051125633, 6 pages.
Huawei, HiSilicon,"Beamformed CSI-RS Design",3GPP TSG RAN WG1 Meeting #82 R1-154349,Beijing, China, Aug. 24-28, 2015,total 4 pages.
Fujitsu, Discussion on beamformed CSI-RS-based scheme for EBF/FD-MIMO 3GPP TSG RAN WG1 Meeting #82, Beijing, China, Aug. 24-28, 2015, R1-154027, 5 pages.

* cited by examiner

INFORMATION INDICATION METHOD, NETWORK DEVICE, AND TERMINAL DEVICE

CROSS-REFERENCE TO RELATED APPLICATIONS

This application is a continuation of International Application No. PCT/CN2017/107137, filed on Oct. 20, 2017, which claims priority of Chinese Patent Application No. CN 201710184932.X, filed on Mar. 24, 2017, which claims priority of Chinese Patent Application No. CN 201710010696.X, filed on Jan. 6, 2017, The disclosures of the aforementioned applications are hereby incorporated by reference in their entireties.

TECHNICAL FIELD

Embodiments of this application relate to the communications field, and more specifically, to an information indication method, a network device, and a terminal device.

BACKGROUND

An existing Long Term Evolution ("LTE" for short) system and LTE-A (LTE Advanced) technology mainly work on a low frequency band. Due to relatively strong penetrability, the low frequency band may have large coverage and may be effectively used to fight against a path loss and shadow fading in a data transmission process. Therefore, a one-to-one correspondence usually exists between antenna elements and radio frequency channels on this frequency band. Alternatively, wide beam analog weighting is used to implement a mapping relationship between radio frequency channels and antenna elements. Therefore, it may be considered that signals from each radio frequency channel have a similar channel large-scale property when arriving at a receive end.

In consideration of abundant spectrum resources of a millimeter-wave band, the millimeter-wave band becomes one of main operating bands of 5G technologies. When the millimeter-wave band is used, because the millimeter-wave band has a large path loss in a data transmission process and poor fading resistance performance, narrow-beam analog weighting processing needs to be used between a radio frequency channel and an antenna element. In addition, to implement cell coverage and reduce implementation costs, a quantity of analog weights is often far greater than a quantity of radio frequency channels. The analog weights used for the same radio frequency channel at different moments can be switched dynamically. Channel impacts on different narrow beams in the transmission process are significantly different. Therefore, it cannot be considered at the receive end that radio frequency channels using different narrow-beam analog weights have a relatively similar channel large-scale property. In other words, channel estimation needs to be separately performed for radio frequency ports on which narrow-beam analog weighting is differently performed.

A network device usually performs real-time scheduling based on channel measurement and feedback of a pilot signal, to serve a user. Therefore, timing and accuracy of pilot measurement directly affect spectrum efficiency of a system and user experience. However, during pilot measurement in the existing LTE technology and LTE-A technology, it is generally assumed that all radio frequency channels have a similar channel large-scale property, and channel measurement and estimation are jointly performed. In the prior art, channel measurement and report of different analog beams cannot be implemented. As a result, multiple-input multiple-output ("MIMO" for short) transmission of the network device based on a plurality of different analog beams is not supported, thereby greatly affecting scheduling flexibility of the network device, and further affecting spectrum efficiency of a system and user experience.

SUMMARY

Embodiments of this application provide an information indication method, a network device, and a terminal device, to improve scheduling flexibility of a network device based on a plurality of analog beams.

According to a first aspect, an information indication method is provided. The method includes: generating, by a network device, control information, where the control information includes first indication information, second indication information, and third indication information, where the first indication information is used to indicate a plurality of CSI-RS resources, the second indication information is used to indicate at least one piece of the following information: beam index information of the plurality of CSI-RS resources that is sent by the network device, beam index information of the plurality of CSI-RS resources that is received by a terminal device, or beam pair information corresponding to the network device and the terminal, and the third indication information is used to indicate a measurement method of the plurality of CSI-RS resources; and sending, by the network device, the control information to the terminal device.

With reference to the first aspect, in a first possible implementation of the first aspect, the control information further includes fourth indication information, and the fourth indication information is used to indicate a plurality of channel state information-interference measurement CSI-IM resources.

With reference to the first aspect or the first possible implementation of the first aspect, in a second possible implementation of the first aspect, the network device adds the first indication information, the second indication information, and the third indication information to a channel state information measurement setting CSI-measurement setting, and sends the channel state information measurement setting to the terminal device, where the CSI-measurement setting includes the control information.

With reference to any one of the first aspect, the first possible implementation of the first aspect, and the second possible implementation of the first aspect, in a third possible implementation of the first aspect, when the third indication information is a first value, the third indication information is used to instruct the terminal device to separately perform channel measurement on the plurality of CSI-RS resources and feed back measurement information corresponding to all the CSI-RS resources.

With reference to any one of the first aspect, the first possible implementation of the first aspect, and the second possible implementation of the first aspect, in a fourth possible implementation of the first aspect, when the third indication information is a second value, the third indication information is used to instruct the terminal device to separately perform channel measurement on the plurality of CSI-RS resources and feed back measurement information corresponding to one CSI-RS resource with best channel quality.

With reference to any one of the first aspect, the first possible implementation of the first aspect, and the second possible implementation of the first aspect, in a fifth possible implementation of the first aspect, when the third indication information is a third value, the third indication information is used to instruct the terminal device to separately perform channel measurement on the plurality of CSI-RS resources and combine channel matrices obtained after estimation is performed on the plurality of CSI-RS resources.

In some possible implementations, when the third indication information is a fourth value, the third indication information is used to instruct the terminal device to separately perform channel measurement on the plurality of CSI-RS resources and feed back measurement information corresponding to first two CSI-RS resources with best channel quality.

In some possible implementations, when there are at least three CSI-RS resources, and the third indication information is a fifth value, the third indication information is used to instruct the terminal device to separately perform channel measurement on the plurality of CSI-RS resources and feed back measurement information corresponding to first three CSI-RS resources with best channel quality.

The information indication method in this embodiment of this application can be used to shorten a pilot measurement delay based on a plurality of analog beams, reduce pilot resource configuration overheads, and improve scheduling flexibility of the network device based on a plurality of analog beams.

According to a second aspect, an information indication method is provided. The method includes: generating, by a network device, control information, where the control information includes one or more CSI-RS resources, each CSI-RS resource includes quasi co-location QCL indication information, and the QCL indication information is used to indicate whether antenna ports in each CSI-RS resource have a similar channel large-scale property; and sending, by the network device, the control information to a terminal device.

In some possible implementations, each CSI-RS resource further includes second indication information, and the second indication information is used to indicate at least one piece of the following information: beam index information of a plurality of CSI-RS ports that is sent by the network device, beam index information of a plurality of CSI-RS ports that is received by the terminal device, or beam pair information corresponding to the network device and the terminal.

In some possible implementations, the network device adds the QCL indication information to a channel state information measurement setting CSI-measurement setting, and sends the channel state information measurement setting to the terminal device, where the CSI-measurement setting includes the control information.

With reference to the second aspect, in a first possible implementation of the second aspect, when the QCL indication information is a first value, the QCL indication information is used to indicate that antenna ports in each CSI-RS resource have a similar channel large-scale property.

With reference to the second aspect, in a second possible implementation of the second aspect, when the QCL indication information is a second value, the QCL indication information is used to indicate that antenna ports in each CSI-RS resource do not have a similar channel large-scale property.

With reference to the second aspect, in a third possible implementation of the second aspect, when the QCL indication information is a third value, the QCL indication information is used to indicate that at least some antenna ports in each CSI-RS resource have a similar channel large-scale property.

With reference to the third possible implementation of the second aspect, in a fourth possible implementation of the second aspect, the plurality of CSI-RS resources further include QCL mapping port information, and the QCL mapping port information is used to indicate antenna ports that have a similar channel large-scale property.

In some possible implementations, the network device adds the QCL mapping port information to a channel state information measurement setting CSI-measurement setting, and sends the channel state information measurement setting to the terminal device, where the CSI-measurement setting includes the control information.

According to a third aspect, an information indication method is provided. The method includes: generating, by a network device, control information, where the control information includes fifth indication information, and the fifth indication information is used to instruct a terminal device whether to feed back, to the network device, a value of interference from the outside of a serving cell; and sending, by the network device, the control information to the terminal device.

In a possible design, the control information includes channel quality information report configuration CQI-report config information.

In some possible implementations, the network device adds the CQI-report config information to a channel state information measurement setting CSI-measurement setting, and sends the channel state information measurement setting to the terminal device.

With reference to the third aspect, in a first possible implementation of the third aspect, when the fifth indication information is a first value, the fifth indication information is used to instruct the terminal device to skip feeding back the value of interference from the outside of the serving cell.

With reference to the third aspect, in a second possible implementation of the third aspect, when the fifth indication information is a second value, the fifth indication information is used to instruct the terminal device to feed back the value of interference from the outside of the serving cell.

According to a fourth aspect, an information indication method is provided. The method includes: generating, by a network device, control information, where the control information includes sixth indication information, and the sixth indication information is used to instruct a terminal device to feed back channel time-domain angle-domain energy or channel frequency-domain angle-domain energy to the network device; and sending, by the network device, CSI-RS measurement configuration information to the terminal device.

In a possible design, the control information includes channel quality information report configuration CQI-report config information.

In some possible implementations, the network device adds the CQI-report config information to a channel state information measurement setting CSI-measurement setting, and sends the channel state information measurement setting to the terminal device.

With reference to the fourth aspect, in a first possible implementation of the fourth aspect, when the sixth indication information is a first value, the sixth indication information is used to instruct the terminal device to skip feeding back explicit channel information.

With reference to the fourth aspect, in a second possible implementation of the fourth aspect, when the sixth indication information is a second value, the sixth indication information is used to instruct the terminal device to feed back the channel time-domain angle-domain energy.

With reference to the fourth aspect, in a third possible implementation of the fourth aspect, when the sixth indication information is a third value, the sixth indication information is used to instruct the terminal device to feed back the channel frequency-domain angle-domain energy.

According to a fifth aspect, an information indication method is provided. The method includes: receiving, by a terminal device, control information sent by a network device, where the control information includes first indication information, second indication information, and third indication information, where the first indication information is used to indicate a plurality of CSI-RS resources, the second indication information is used to indicate at least one piece of the following information: beam index information of the plurality of CSI-RS resources that is sent by the network device, beam index information of the plurality of CSI-RS resources that is received by the terminal device, or beam pair information corresponding to the network device and the terminal, and the third indication information is used to indicate a measurement method of the plurality of CSI-RS resources; and performing, by the terminal device, channel measurement on the plurality of CSI-RS resources based on the control information.

With reference to the fifth aspect, in a first possible implementation of the fifth aspect, the control information further includes fourth indication information, and the fourth indication information is used to indicate a plurality of channel state information-interference measurement CSI-IM resources.

With reference to the fifth aspect or the first possible implementation of the fifth aspect, in a second possible implementation of the fifth aspect, the terminal device receives the first indication information, the second indication information, and the third indication information through a CSI-measurement setting.

With reference to any one of the fifth aspect, the first possible implementation of the fifth aspect, and the second possible implementation of the fifth aspect, in a third possible implementation of the fifth aspect, when the third indication information is a first value, the third indication information is used to instruct the terminal device to separately perform channel measurement on the plurality of CSI-RS resources and feed back measurement information corresponding to all the CSI-RS resources.

With reference to any one of the fifth aspect, the first possible implementation of the fifth aspect, and the second possible implementation of the fifth aspect, in a fourth possible implementation of the fifth aspect, when the third indication information is a second value, the third indication information is used to instruct the terminal device to separately perform channel measurement on the plurality of CSI-RS resources and feed back measurement information corresponding to one CSI-RS resource with best channel quality.

With reference to any one of the fifth aspect, the first possible implementation of the fifth aspect, and the second possible implementation of the fifth aspect, in a fifth possible implementation of the fifth aspect, when the third indication information is a third value, the third indication information is used to instruct the terminal device to separately perform channel measurement on the plurality of CSI-RS resources and combine channel matrices obtained after estimation is performed on the plurality of CSI-RS resources.

In some possible implementations, when the third indication information is a fourth value, the third indication information is used to instruct the terminal device to separately perform channel measurement on the plurality of CSI-RS resources and feed back measurement information corresponding to first two CSI-RS resources with best channel quality.

In some possible implementations, when there are at least three CSI-RS resources, and the third indication information is a fifth value, the third indication information is used to instruct the terminal device to separately perform channel measurement on the plurality of CSI-RS resources and feed back measurement information corresponding to first three CSI-RS resources with best channel quality.

The information indication method in this embodiment of this application can be used to shorten a pilot measurement delay based on a plurality of analog beams, reduce pilot resource configuration overheads, and improve scheduling flexibility of the network device based on a plurality of analog beams.

According to a sixth aspect, an information indication method is provided. The method includes: receiving, by a terminal device, control information sent by a network device, where the control information includes one or more CSI-RS resources, each CSI-RS resource includes quasi co-location QCL indication information, and the QCL indication information is used to indicate whether antenna ports in each CSI-RS resource have a similar channel large-scale property; and performing, by the terminal device, channel measurement on the plurality of CSI-RS resources based on the control information.

In some possible implementations, each CSI-RS resource further includes second indication information, and the second indication information is used to indicate beam index information of a plurality of CSI-RS ports that is sent by the network device, beam index information of a plurality of CSI-RS ports that is received by the terminal device, or beam pair information corresponding to the network device and the terminal.

In some possible implementations, the terminal device receives the QCL indication information through a CSI-measurement setting.

With reference to the sixth aspect, in a first possible implementation of the sixth aspect, when the QCL indication information is a first value, the QCL indication information is used to indicate that antenna ports in each CSI-RS resource have a similar channel large-scale property.

With reference to the sixth aspect, in a second possible implementation of the sixth aspect, when the QCL indication information is a second value, the QCL indication information is used to indicate that antenna ports in each CSI-RS resource do not have a similar channel large-scale property.

With reference to the sixth aspect, in a third possible implementation of the sixth aspect, when the QCL indication information is a third value, the QCL indication information is used to indicate that at least some antenna ports in each CSI-RS resource have a similar channel large-scale property.

With reference to the second possible implementation of the sixth aspect, in a fourth possible implementation of the sixth aspect, the plurality of CSI-RS resources further include QCL mapping port information, and the QCL mapping port information is used to indicate antenna ports that have a similar channel large-scale property.

In some possible implementations, the terminal device receives the QCL mapping port information through a CSI-measurement setting.

According to a seventh aspect, an information indication method is provided. The method includes: receiving, by a terminal device, control information sent by a network device, where the control information includes one or more CSI-RS resources, the control information further includes fifth indication information, and the fifth indication information is used to instruct the terminal device whether to feed back, to the network device, a value of interference from the outside of a serving cell; and performing, by the terminal device, channel measurement on the one or more CSI-RS resources based on the control information.

In a possible design, the control information includes channel quality information report configuration CQI-report config information.

In some possible implementations, the terminal device receives the CQI-report config information through a CSI-measurement setting.

With reference to the seventh aspect, in a first possible implementation of the seventh aspect, when the fifth indication information is a first value, the fifth indication information is used to instruct the terminal device to skip feeding back the value of interference from the outside of the serving cell.

With reference to the seventh aspect, in a second possible implementation of the seventh aspect, when the fifth indication information is a second value, the fifth indication information is used to instruct the terminal device to feed back the value of interference from the outside of the serving cell.

According to an eighth aspect, an information indication method is provided. The method includes: receiving, by a terminal device, control information sent by a network device, where the control information includes one or more CSI-RS resources, the control information further includes sixth indication information, and the sixth indication information is used to instruct the terminal device to feed back channel time-domain angle-domain energy or channel frequency-domain angle-domain energy to the network device; and performing, by the terminal device, channel measurement on the one or more CSI-RS resources based on the control information.

In a possible implementation, the control information includes channel quality information report configuration CQI-report config information.

In some possible implementations, the terminal device receives the CQI-report config information through a CSI-measurement setting.

With reference to the eighth aspect, in a first possible implementation of the eighth aspect, when the sixth indication information is a first value, the sixth indication information is used to instruct the terminal device to skip feeding back explicit channel information.

With reference to the eighth aspect, in a second possible implementation of the eighth aspect, when the sixth indication information is a second value, the sixth indication information is used to instruct the terminal device to feed back the channel time-domain angle-domain energy.

With reference to the eighth aspect, in a third possible implementation of the eighth aspect, when the sixth indication information is a third value, the sixth indication information is used to instruct the terminal device to feed back the channel frequency-domain angle-domain energy.

According to a ninth aspect, a network device is provided. The network device includes processor, a memory, and a transceiver. The processor is configured to generate control information, where the control information includes first indication information, second indication information, and third indication information, where the first indication information is used to indicate a plurality of CSI-RS resources, the second indication information is used to indicate beam index information of the plurality of CSI-RS resources that is sent by the network device, beam index information of the plurality of CSI-RS resources that is received by a terminal device, or beam pair information corresponding to the network device and the terminal, and the third indication information is used to indicate a measurement method of the plurality of CSI-RS resources. The transceiver is configured to send the control information to the terminal device.

With reference to the ninth aspect, in a first possible implementation of the ninth aspect, the control information further includes fourth indication information, and the fourth indication information is used to indicate a plurality of channel state information-interference measurement CSI-IM resources.

With reference to the ninth aspect or the first possible implementation of the ninth aspect, in a second possible implementation of the ninth aspect, the transceiver is further configured to: add the first indication information, the second indication information, and the third indication information to a channel state information measurement setting CSI-measurement setting, and send the channel state information measurement setting to the terminal device, where the CSI-measurement setting includes the control information.

With reference to any one of the ninth aspect, the first possible implementation of the ninth aspect, and the second possible implementation of the ninth aspect, in a third possible implementation of the ninth aspect, when the third indication information is a first value, the third indication information is used to instruct the terminal device to separately perform channel measurement on the plurality of CSI-RS resources and feed back measurement information corresponding to all the CSI-RS resources.

With reference to any one of the ninth aspect, the first possible implementation of the ninth aspect, and the second possible implementation of the ninth aspect, in a fourth possible implementation of the ninth aspect, when the third indication information is a second value, the third indication information is used to instruct the terminal device to separately perform channel measurement on the plurality of CSI-RS resources and feed back measurement information corresponding to one CSI-RS resource with best channel quality.

With reference to any one of the ninth aspect, the first possible implementation of the ninth aspect, and the second possible implementation of the ninth aspect, in a fifth possible implementation of the first aspect, when the third indication information is a third value, the third indication information is used to instruct the terminal device to separately perform channel measurement on the plurality of CSI-RS resources and combine channel matrices obtained after estimation is performed on the plurality of CSI-RS resources.

In some possible implementations, when the third indication information is a fourth value, the third indication information is used to instruct the terminal device to separately perform channel measurement on the plurality of CSI-RS resources and feed back measurement information corresponding to first two CSI-RS resources with best channel quality.

In some possible implementations, when there are at least three CSI-RS resources, and the third indication information is a fifth value, the third indication information is used to instruct the terminal device to separately perform channel measurement on the plurality of CSI-RS resources and feed back measurement information corresponding to first three CSI-RS resources with best channel quality.

The information indication network device in this embodiment of this application can be used to shorten a pilot measurement delay based on a plurality of analog beams, reduce pilot resource configuration overheads, and improve scheduling flexibility of the network device based on a plurality of analog beams.

According to a tenth aspect, a network device is provided. The network device includes a processor, a memory, and a transceiver. The processor is configured to generate control information, where the control information includes one or more CSI-RS resources, each CSI-RS resource includes quasi co-location QCL indication information, and the QCL indication information is used to indicate whether antenna ports in each CSI-RS resource have a similar channel large-scale property. The transceiver is configured to send the control information to a terminal device.

In some possible implementations, each CSI-RS resource further includes second indication information, and the second indication information is used to indicate beam index information of a plurality of CSI-RS ports that is sent by the network device, beam index information of a plurality of CSI-RS ports that is received by the terminal device, or beam pair information corresponding to the network device and the terminal.

In some possible implementations, the transceiver is further configured to: add the QCL indication information to a channel state information measurement setting CSI-measurement setting, and send the channel state information measurement setting to the terminal device, where the CSI-measurement setting includes the control information.

With reference to the tenth aspect, in a first possible implementation of the tenth aspect, when the QCL indication information is a first value, the QCL indication information is used to indicate that antenna ports in each CSI-RS resource have a similar channel large-scale property.

With reference to the tenth aspect, in a second possible implementation of the tenth aspect, when the QCL indication information is a second value, the QCL indication information is used to indicate that antenna ports in each CSI-RS resource do not have a similar channel large-scale property.

With reference to the tenth aspect, in a third possible implementation of the tenth aspect, when the QCL indication information is a third value, the QCL indication information is used to indicate that at least some antenna ports in each CSI-RS resource have a similar channel large-scale property.

With reference to the third possible implementation of the tenth aspect, in a fourth possible implementation of the tenth aspect, the plurality of CSI-RS resources further include QCL mapping port information, and the QCL mapping port information is used to indicate antenna ports that have a similar channel large-scale property.

In some possible implementations, the transceiver is further configured to: add the QCL mapping port information to a channel state information measurement setting CSI-measurement setting, and send the channel state information measurement setting to the terminal device, where the CSI-measurement setting includes the control information.

According to an eleventh aspect, an information indication network device is provided. The network device includes a processor and a transceiver. The processor is configured to generate control information, where the control information includes fifth indication information, and the fifth indication information is used to instruct a terminal device whether to feed back, to the network device, a value of interference from the outside of a serving cell. The transceiver is configured to send CSI-RS measurement configuration information to the terminal device.

In a possible implementation, the control information includes channel quality information report configuration CQI-report config information.

In some possible implementations, the transceiver is further configured to: add the CQI-report config information to a channel state information measurement setting CSI-measurement setting, and send the channel state information measurement setting to the terminal device.

With reference to the eleventh aspect, in a first possible implementation of the eleventh aspect, when the fifth indication information is a first value, the fifth indication information is used to instruct the terminal device to skip feeding back the value of interference from the outside of the serving cell.

With reference to the eleventh aspect, in a second possible implementation of the eleventh aspect, when the fifth indication information is a second value, the fifth indication information is used to instruct the terminal device to feed back the value of interference from the outside of the serving cell.

According to a twelfth aspect, an information indication network device is provided. The network device includes a processor, a memory, a transceiver, an antenna, a bus, and a user interface. The processor is configured to generate control information, where the control information includes sixth indication information, and the sixth indication information is used to instruct a terminal device to feed back channel time-domain angle-domain energy or channel frequency-domain angle-domain energy to the network device. The network device sends the control information to the terminal device.

In a possible design, the control information includes channel quality information report configuration CQI-report config information.

In some possible implementations, the transceiver is further configured to: add the CQI-report config information to a channel state information measurement setting CSI-measurement setting, and send the channel state information measurement setting to the terminal device, where the CSI-measurement setting includes the control information.

With reference to the twelfth aspect, in a first possible implementation of the twelfth aspect, when the sixth indication information is a first value, the sixth indication information is used to instruct the terminal device to skip feeding back explicit channel information.

With reference to the twelfth aspect, in a second possible implementation of the twelfth aspect, when the sixth indication information is a second value, the sixth indication information is used to instruct the terminal device to feed back the channel time-domain angle-domain energy.

With reference to the twelfth aspect, in a third possible implementation of the twelfth aspect, when the sixth indication information is a third value, the sixth indication information is used to instruct the terminal device to feed back the channel frequency-domain angle-domain energy.

According to a thirteenth aspect, an information indication terminal device is provided. The terminal device includes a processor, a memory, a transceiver, an antenna, a bus, and a user interface. The transceiver is configured to receive control information sent by a network device, where the control information includes first indication information, second indication information, and third indication information, where the first indication information is used to indicate a plurality of CSI-RS resources, the second indication information is used to indicate beam index information of the plurality of CSI-RS resources that is sent by the network device, beam index information of the plurality of CSI-RS resources that is received by the terminal device, or beam pair information corresponding to the network device and the terminal, and the third indication information is used to indicate a measurement method of the plurality of CSI-RS resources. The processor is configured to perform channel measurement on the plurality of CSI-RS resources based on the control information.

With reference to the thirteenth aspect, in a first possible implementation of the thirteenth aspect, the control information further includes fourth indication information, and the fourth indication information is used to indicate a plurality of channel state information-interference measurement CSI-IM resources.

With reference to the thirteenth aspect or the first possible implementation of the thirteenth aspect, in a second possible implementation of the thirteenth aspect, the transceiver is further configured to receive the first indication information, the second indication information, and the third indication information through a CSI-measurement setting, where the CSI-measurement setting includes the control information.

With reference to any one of the thirteenth aspect, the first possible implementation of the thirteenth aspect, and the second possible implementation of the thirteenth aspect, in a third possible implementation of the thirteenth aspect, when the third indication information is a first value, the third indication information is used to instruct the terminal device to separately perform channel measurement on the plurality of CSI-RS resources and feed back measurement information corresponding to all the CSI-RS resources.

With reference to any one of the thirteenth aspect, the first possible implementation of the thirteenth aspect, and the second possible implementation of the thirteenth aspect, in a fourth possible implementation of the thirteenth aspect, when the third indication information is a second value, the third indication information is used to instruct the terminal device to separately perform channel measurement on the plurality of CSI-RS resources and feed back measurement information corresponding to one CSI-RS resource with best channel quality.

With reference to any one of the thirteenth aspect, the first possible implementation of the thirteenth aspect, and the second possible implementation of the thirteenth aspect, in a fifth possible implementation of the thirteenth aspect, when the third indication information is a third value, the third indication information is used to instruct the terminal device to separately perform channel measurement on the plurality of CSI-RS resources and combine channel matrices obtained after estimation is performed on the plurality of CSI-RS resources.

In some possible implementations, when the third indication information is a fourth value, the third indication information is used to instruct the terminal device to separately perform channel measurement on the plurality of CSI-RS resources and feed back measurement information corresponding to first two CSI-RS resources with best channel quality.

In some possible implementations, when there are at least three CSI-RS resources, and the third indication information is a fifth value, the third indication information is used to instruct the terminal device to separately perform channel measurement on the plurality of CSI-RS resources and feed back measurement information corresponding to first three CSI-RS resources with best channel quality.

The information indication terminal device in this embodiment of this application can be used to shorten a pilot measurement delay based on a plurality of analog beams, reduce pilot resource configuration overheads, and improve scheduling flexibility of the network device based on a plurality of analog beams.

According to a fourteenth aspect, an information indication terminal device is provided. The terminal device includes a processor, a memory, a transceiver, an antenna, a bus, and a user interface. The transceiver is configured to receive control information sent by a network device, where the control information includes one or more CSI-RS resources, each CSI-RS resource includes quasi co-location QCL indication information, and the QCL indication information is used to indicate whether antenna ports in each CSI-RS resource have a similar channel large-scale property. The processor is configured to perform channel measurement on the plurality of CSI-RS resources based on the control information.

In some possible implementations, each CSI-RS resource further includes second indication information, and the second indication information is used to indicate beam index information of a plurality of CSI-RS ports that is sent by the network device, beam index information of a plurality of CSI-RS ports that is received by the terminal device, or beam pair information corresponding to the network device and the terminal.

In some possible implementations, the transceiver is further configured to receive the QCL indication information through a CSI-measurement setting, where the CSI-measurement setting includes the control information.

With reference to the fourteenth aspect, in a first possible implementation of the fourteenth aspect, when the QCL indication information is a first value, the QCL indication information is used to indicate that antenna ports in each CSI-RS resource have a similar channel large-scale property.

With reference to the fourteenth aspect, in a second possible implementation of the fourteenth aspect, when the QCL indication information is a second value, the QCL indication information is used to indicate that antenna ports in each CSI-RS resource do not have a similar channel large-scale property.

With reference to the fourteenth aspect, in a third possible implementation of the fourteenth aspect, when the QCL indication information is a third value, the QCL indication information is used to indicate that at least some antenna ports in each CSI-RS resource have a similar channel large-scale property.

With reference to the second possible implementation of the fourteenth aspect, in a fourth possible implementation of the fourteenth aspect, the plurality of CSI-RS resources further include QCL mapping port information, and the QCL mapping port information is used to indicate antenna ports that have a similar channel large-scale property.

In some possible implementations, the transceiver is further configured to receive the QCL mapping port information through a CSI-measurement setting, where the CSI-measurement setting includes the control information.

According to a fifteenth aspect, an information indication terminal device is provided. The terminal device includes a processor, a memory, a transceiver, an antenna, a bus, and a user interface. The transceiver is configured to receive control information sent by a network device, where the control information includes one or more CSI-RS resources, the control information further includes fifth indication information, and the fifth indication information is used to instruct the terminal device whether to feed back, to the network device, a value of interference from the outside of a serving cell. The processor is configured to perform channel measurement on the one or more CSI-RS resources based on the control information.

In a possible design, the control information further includes channel quality information report configuration CQI-report config information.

In some possible implementations, the transceiver is further configured to receive the CQI-report config information through a CSI-measurement setting, where the CSI-measurement setting includes the control information.

With reference to the fifteenth aspect, in a first possible implementation of the fifteenth aspect, when the fifth indication information is a first value, the fifth indication information is used to instruct the terminal device to skip feeding back the value of interference from the outside of the serving cell.

With reference to the fifteenth aspect, in a second possible implementation of the fifteenth aspect, when the fifth indication information is a second value, the fifth indication information is used to instruct the terminal device to feed back the value of interference from the outside of the serving cell.

According to a sixteenth aspect, an information indication terminal device is provided. The terminal device includes a processor, a memory, a transceiver, an antenna, a bus, and a user interface. The transceiver is configured to receive control information sent by a network device, where the control information includes one or more CSI-RS resources, the control information further includes sixth indication information, and the sixth indication information is used to instruct the terminal device to feed back channel time-domain angle-domain energy or channel frequency-domain angle-domain energy to the network device. The processor is configured to perform channel measurement on the one or more CSI-RS resources based on the control information.

In a possible design, the control information includes CQI report config information.

In some possible implementations, the transceiver is further configured to receive the CQI-report config information through a CSI-measurement setting, where the CSI-measurement setting includes the control information.

With reference to the sixteenth aspect, in a first possible implementation of the sixteenth aspect, when the sixth indication information is a first value, the sixth indication information is used to instruct the terminal device to skip feeding back explicit channel information.

With reference to the sixteenth aspect, in a second possible implementation of the sixteenth aspect, when the sixth indication information is a second value, the sixth indication information is used to instruct the terminal device to feed back the channel time-domain angle-domain energy.

With reference to the sixteenth aspect, in a third possible implementation of the sixteenth aspect, when the sixth indication information is a third value, the sixth indication information is used to instruct the terminal device to feed back the channel frequency-domain angle-domain energy.

Another aspect of this application provides a computer-readable storage medium. The computer-readable storage medium stores an instruction. When the computer-readable storage medium runs on a computer, the computer performs the methods in the foregoing aspects.

With reference to all the foregoing aspects, in a possible design, the beam pair information may be a combination of one or more pieces of the following information:

first indication information, used to indicate beam pair index types corresponding to different types or functions or processes;

second indication information, where the indication information is group index Group ID information or bitmap Bit-Map information;

third indication information, where the indication information is a logical ID or bitmap Bit-Map information of a transmit beam; or fourth indication information, where the indication information is a logical ID or bitmap Bit-Map information of a receive beam.

Still another aspect of this application provides a computer program product that includes an instruction. When the computer program product runs on a computer, the computer performs the methods in the foregoing aspects.

DESCRIPTION OF EMBODIMENTS

The following describes technical solutions of the embodiments in this application with reference to the accompanying drawings.

Figure 1:
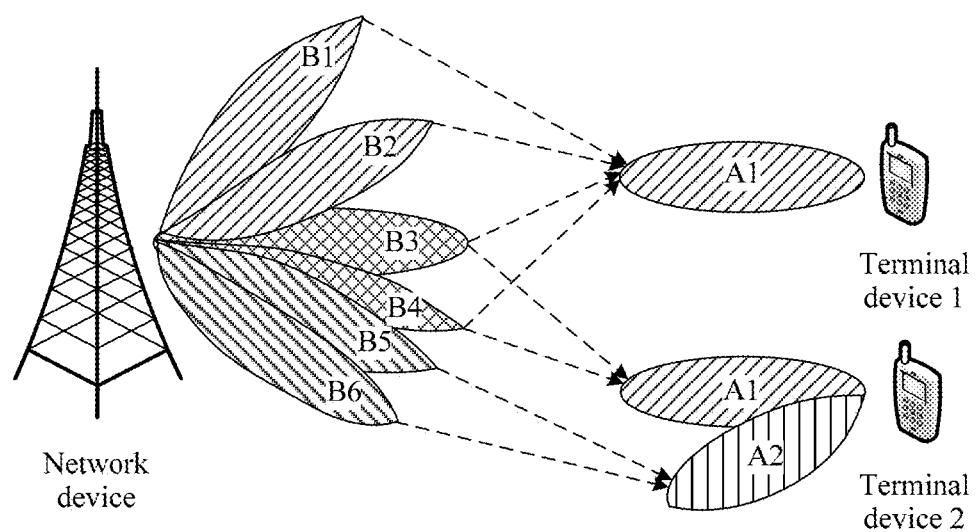
FIG. 1 is a schematic diagram of an application scenario of a technical solution according to an embodiment of this application.

FIG. 1 is a schematic diagram of an application scenario of a technical solution according to an embodiment of this application. As shown in FIG. 1, a network device has six same or different transmit beams B1 to B6 on radio frequency channels. Analog weighting processing is performed differently on the six same or different beams. A terminal device 1 serves as a receive end of a radio frequency channel and has a beam A1, and a terminal device 2 serves as a receive end of a radio frequency channel and has two beams A1 and A2. Beam pair information is established between the network device and the terminal device 1 by using B1 to B4 and A1, to implement communication between the network device and the terminal device 1. Beam pair information is established between the network device and the terminal device 2 by using B5, B6, A1, and A2, to implement communication between the network device and the terminal device 2. It should be understood that this application is applicable to any communication between a network device and a terminal device based on analog beam weighting.

It should be understood that, the technical solutions in the embodiments of this application may be applied to various communications systems, such as a Global System for Mobile Communications ("GSM" for short), a Code Division Multiple Access ("CDMA" for short) system, a Wideband Code Division Multiple Access ("WCDMA" for short) system, a Long Term Evolution ("LTE" for short) system, an LTE frequency division duplex ("FDD" for short) system, an LTE time division duplex ("TDD" for short) system, a Universal Mobile Telecommunications System ("UMTS" for short), and a future 5th generation ("5G" for short) communications system.

This application describes the embodiments with reference to a terminal device. The terminal device may also be referred to as user equipment ("terminal device" for short), an access terminal, a subscriber unit, a subscriber station, a mobile station, a mobile station, a remote console, a remote terminal, a mobile device, a user terminal, a terminal, a radio communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device or another processing device connected to a wireless modem, an in-vehicle device, a wearable device, a terminal device in a future 5G network, or a terminal device in a future evolved public land mobile network ("PLMN" for short).

This application describes the embodiments with reference to a network device. The network device may be a device configured to communicate with a terminal device. For example, the network device may be a combination of a base transceiver station ("BTS" for short) in a GSM system or a CDMA system and a base station controller ("BSC" for short), may be a NodeB ("NB" for short) in a WCDMA system and a radio network controller ("RNC" for short), or may be an evolved NodeB ("eNB" or "eNodeB" for short) in an LTE system. Alternatively, the network device may be a relay station, an access point, an in-vehicle device, a wearable device, an access network device in a future 5G network such as a next-generation base station, an access network device in a future evolved PLMN network, or the like.

Figure 2:
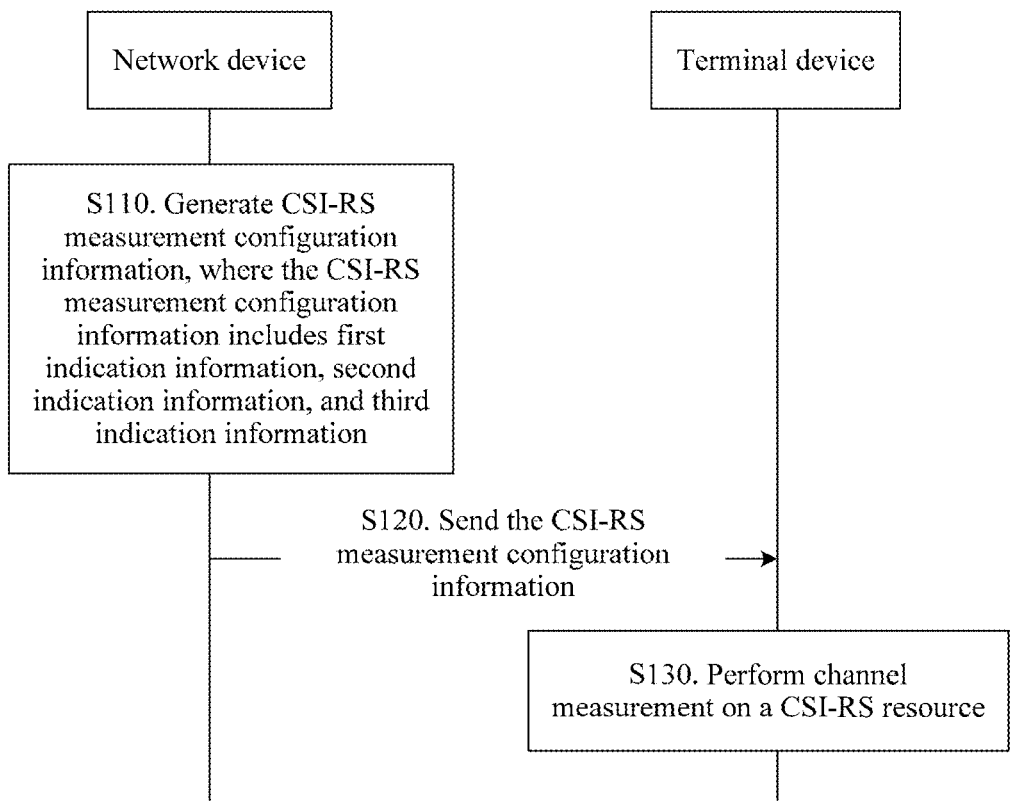
FIG. 2 is a schematic flowchart of an information indication method according to an embodiment of this application.

FIG. 2 is a schematic flowchart of an information indication method according to an embodiment of this application. In FIG. 2, a network device may be the network device in FIG. 1, and a terminal device may be the terminal device in FIG. 1.

S110. The network device generates control information, where the control information includes first indication information, second indication information, and third indication information.

S120. The network device sends the control information to the terminal device.

S130. The terminal device performs channel measurement on a plurality of CSI-RS resources based on the control information.

The control information may be channel state information-reference signal CSI-RS measurement configuration information or other configuration information. The following uses the CSI-RS measurement configuration information as an example for description.

The network device generates the CSI-RS measurement configuration information, where the CSI-RS measurement configuration information includes the first indication information, the second indication information, and the third indication information. The first indication information is used to indicate the plurality of CSI-RS resources, the second indication information is used to indicate beam index information of the plurality of CSI-RS resources that is sent by the network device, beam index information of the plurality of CSI-RS resources that is received by the terminal device, or beam pair information corresponding to the network device and the terminal, and the third indication information is used to indicate a measurement method of the plurality of CSI-RS resources. The network device sends the CSI-RS measurement configuration information to the terminal device. After receiving the CSI-RS measurement configuration information, the terminal device performs channel measurement on the plurality of CSI-RS resources.

It should be understood that the first indication information may be an information bit or an information element in the CSI-RS measurement configuration information. For example, a new information bit or information element, for example, "csi-RS-ConfigNZPIdList", may be defined in the CSI-RS measurement configuration information. The information bit or the information element may be used to indicate the plurality of CSI-RS resources.

Optionally, analog beam weighting processing is performed for a plurality of CSI-RS ports in each CSI-RS resource in a same manner or different manners.

Optionally, analog beam weighting processing is performed for different CSI-RS resources in a same manner or different manners.

It should be further understood that the second indication information may also be an information bit or an information element in the CSI-RS measurement configuration information. For example, a new information bit or information element, for example, a beam index list "beamindexList", may be defined in the CSI-RS measurement configuration information. The beam index list may be used to indicate at least one piece of the following information: the beam index information of the plurality of CSI-RS resources that is sent by the network device, the beam index information of the plurality of CSI-RS resources that is received by the terminal device, or the beam pair information corresponding to the network device and the terminal device. When the information bit or the information element is used to indicate the beam index information of the plurality of CSI-RS resources that is sent by the network device, the network device implicitly instructs the terminal device to receive the beam index information of the plurality of CSI-RS resources. When the information bit or the information element is used to indicate the beam index information of the plurality of CSI-RS resources that is received by the terminal device, the network device explicitly instructs the terminal device to receive the beam index information of the plurality of CSI-RS resources. When the information bit or the information element is used to indicate the beam pair information corresponding to the network device and the terminal, the information bit or the information element is used to not only indicate the beam index information of the plurality of CSI-RS resources that is sent by the network device, but also indicate the beam index information of the plurality of CSI-RS resources that is received by the terminal device.

Specifically, in step 210, in first configuration information, receive beam indication information of the terminal device may be receive beam information used to indicate one or more reference signal ports, receive beam information used to indicate one or more reference signal resources, receive beam information used to indicate a resource set, or receive beam information used to indicate a resource setting. The RS port mentioned in the present invention is used to indicate a time-frequency location of a reference signal in an OFDM symbol, and is not a physical port.

Further, the receive beam indication information of the terminal device may be a transmit beam index, a receive beam index, a beam pair index (used to describe a transmit beam and a receive beam), a quasi co-location (QCL) index or a QCL indicator used to indicate beam information, and any combination of the foregoing several indexes.

When the network device indicates that the receive beam information of the terminal device is a beam pair index, it should be understood that, before the indication, the terminal device first feeds back beam information to the network device, and the network device indicates the receive beam pair (BPL: Beam pair link) information of the terminal device based on the beam information fed back by the terminal device.

Further, the terminal device may specifically feed back beam information of one of or a combination of any two or more pieces of the following information:
a group index Group ID, a receive beam ID, and a transmit beam ID.

The group ID may be one of or a combination of any two or more pieces of the following information:
First information is group information obtained according to a predefined or preconfigured rule, and the rule includes but is not limited to antenna grouping and antenna panel grouping. For example, beams formed by ports on a same antenna panel are in a same group.

Second information includes but is not limited to logical beam ID information, logical group ID information, and bitmap-based logical beam information.

The transmit beam ID may be one of or a combination of more pieces of information of a resource setting (resource setting) index, a resource set (resource set) index, a resource (resource) index, a port index, a time index, and a synchronization block SS block index.

The receive beam ID may be a logical ID of a receive beam of the terminal device. For example, as shown in the following table, the logical ID may be global logical numbers of all beams selected by the terminal device, or may be local logical numbers of all beams corresponding to the group ID. It should be further understood that receive beams corresponding to a same group may be received or sent on the terminal device side at the same time

| Information about a receive beam selected by the device | Global logical number | Local logical number |
|---|---|---|
| 4 | 0 | Group #0: 0 |
| 5 | 1 | Group #0: 1 |
| 9 | 2 | Group #1: 0 |
| 12 | 3 | Group #1: 1 |

When the network device indicates that the receive beam information of the terminal device is a beam pair index (BPL: Beam pair link), the beam pair index information may be one of or a combination of more pieces of the following information:
first indication information, used to indicate beam pair index types corresponding to different types or functions or processes;
second indication information, where the indication information is group index Group ID information;
third indication information, where the indication information is a logical ID or bitmap Bit-Map information of a transmit beam; or
fourth indication information, where the indication information is a logical ID or bitmap Bit-Map information of a receive beam.

The first indication information may be different types of reference signals, and includes but is not limited to an initial access reference signal, a beam management reference signal, a CSI measurement reference signal, and a data transmission reference signal. Alternatively, the first indication information may be different communication processes, and includes but is not limited to an initial access phase, a beam management phase, a CSI measurement phase, and a data transmission phase. For example, the first indication information is of 2 bits. 00 represents the initial access reference signal, 01 represents the beam management reference signal, 10 represents the CSI measurement reference signal, and 11 represents the data transmission reference signal.

The second indication information is a group ID. A representation form of the group ID may be one of or a combination of any two or more pieces of the following information:
First information is group information obtained according to a predefined or preconfigured rule, and the rule includes but is not limited to antenna grouping and antenna panel grouping. For example, beams formed by ports on a same antenna panel are in a same group.

Second information includes but is not limited to logical beam ID information, logical group ID information, and bitmap-based logical beam information.

The third indication information is a logical ID of a transmit beam or indicates a beam index in a bitmap manner. For example, as shown in the following table:

| Beam information fed back by the terminal device | Logical ID | Bitmap information |
|---|---|---|
| 4 | 0 | [1, 1, 0, 1], where 1 indicates |
| 5 | 1 | that the transmit beam is |
| 9 | 2 | selected, and 0 indicates that |
| 12 | 3 | the transmit beam is not selected. |

The fourth indication information is a logical ID of a receive beam or indicates beam index information in a bitmap manner. For example, as shown in the following table, the logical ID may be global logical numbers of all beams selected by the terminal device, or may be local logical numbers of all beams corresponding to the group ID. It should be further understood that receive beams corresponding to a same group may be received or sent on the terminal device side at the same time.

| Information about a beam selected by the terminal device | Global logical number | Local logical number |
|---|---|---|
| 4 | 0 | Group #0: 0 |
| 5 | 1 | Group #0: 1 |
| 9 | 2 | Group #1: 0 |
| 12 | 3 | Group #1: 1 |

It should be further understood that the third indication information may be an information bit or an information element in the CSI-RS measurement configuration information. For example, a new information bit or information element, for example, "csi-rs-bundType", may be defined in the CSI-RS measurement configuration information. The information bit or the information element is used to indicate the measurement method of the plurality of CSI-RS resources.

Optionally, when the third indication information is a first value, the third indication information is used to instruct the terminal device to separately perform channel measurement on the plurality of CSI-RS resources and feed back measurement information corresponding to all the CSI-RS resources.

Optionally, when the third indication information is a second value, the third indication information is used to instruct the terminal device to separately perform channel measurement on the plurality of CSI-RS resources and feed back measurement information corresponding to one CSI-RS resource with best channel quality.

Optionally, when the third indication information is a third value, the third indication information is used to instruct the terminal device to separately perform channel measurement on the plurality of CSI-RS resources and combine channel matrices obtained after estimation is performed on the plurality of CSI-RS resources.

Optionally, when the third indication information is a fourth value, the third indication information is used to instruct the terminal device to separately perform channel measurement on the plurality of CSI-RS resources and feed back measurement information corresponding to first two CSI-RS resources with best channel quality.

Optionally, when the third indication information is a fifth value, the third indication information is used to instruct the terminal device to separately perform channel measurement on the plurality of CSI-RS resources and feed back measurement information corresponding to first three CSI-RS resources with best channel quality.

For example, different values may be assigned to the "csi-rs-bundType" information bit. Different values are used to indicate different measurement methods performed by the terminal device on the plurality of CSI-RS resources. Table 1 provides a specific implementation by using an example in which the CSI-RS measurement configuration information includes four CSI-RS resources. It should be noted that a value in Table 1 is merely an example, and different values may also be assigned to csi-rs-bundType to indicate corresponding meanings.

CSI-RS resources and feeds back measurement information corresponding to first four CSI-RS resources with best channel quality. It should be further understood that, when the value of the "csi-rs-bundType" information bit in Table 1 is 4, the terminal device separately performs channel measurement on the four CSI-RS resources, combines the channels obtained after estimation is performed on the four CSI-RS resources, uses the channels as a whole to estimate information such as a precoding matrix indicator ("PMI" for short), a rank indication ("RI" for short), or a channel quality indicator ("CQI" for short), and reports the information. The following specifically describes the measurement method:

It is assumed that the network device includes four radio frequency channels, and processing may be performed on each radio frequency channel at different moments by using different analog weighting vectors, to be specific, four corresponding narrow-beam analog weight vectors. The terminal device includes two radio frequency channels, and processing may be performed on each radio frequency channel at different moments by using different analog weighting vectors, to be specific, four corresponding narrow-beam analog weight vectors. The terminal device performs pilot measurement and information estimation by using a receive analog beam indicated in "beam-indexList" by the network device.

First, the terminal device separately performs narrow-beam analog weighting processing differently on the four CSI-RS resources. Each CSI-RS resource includes four radio frequency ports.

Channel estimation is performed on each CSI-RS resource:

$$H_{CSI\text{-}RS_n} = \begin{bmatrix} h_{1,1beam_n} & \cdots & h_{1,4beam_n} \\ \vdots & \ddots & \vdots \\ h_{2,1beam_n} & \cdots & h_{2,4beam_n} \end{bmatrix}$$

$H_{CSI\text{-}RS_n}$ represents a channel matrix obtained after the terminal device performs channel estimation on an $n^{th}$

TABLE 1

| Value | Meaning description |
|---|---|
| 0 | Separately perform channel measurement on four CSI-RS resources, and feed back measurement information corresponding to all the CSI-RS resources. |
| 1 | Separately perform channel measurement on four CSI-RS resources, and feed back measurement information corresponding to first one CSI-RS resource with best channel quality. |
| 2 | Separately perform channel measurement on four CSI-RS resources, and feed back measurement information corresponding to first two CSI-RS resources with best channel quality. |
| 3 | Separately perform channel measurement on four CSI-RS resources, and feed back measurement information corresponding to first three CSI-RS resources with best channel quality. |
| 4 | Separately perform channel measurement on four CSI-RS resources, combine channels obtained after estimation is performed on the four CSI-RS resources, use the channels as a whole to estimate information such as a PMI/an RI/a CQI, and report the information. |

It should be understood that Table 1 is merely described by using an example in which the CSI-RS measurement configuration information includes four CSI-RS resources. This application is not limited thereto. For example, when the CSI-RS measurement configuration information includes six CSI-RS resources, a value may be assigned to the "csi-rs-bundType" information bit, so that the terminal device separately performs channel measurement on the six CSI-RS resources, and $h_{1,1beam_n}$ represents channel information from a first transmit antenna to a first receive antenna based on a specific analog weight vector $beam_n$.

Then, the terminal device combines channel matrices obtained after channel estimation is separately performed on the four CSI-RS resources. A combined channel matrix is as follows:

$$H = [H_{CSI\text{-}RS1} \ H_{CSI\text{-}RS2} \ H_{CSI\text{-}RS3} \ H_{CSI\text{-}RS4}]$$

$$H_{CSI\text{-}RS_n} = \begin{bmatrix} h_{1,1beam1} & \cdots & h_{1,4beam4} \\ \cdots & & \cdots \\ \cdots & & \cdots \\ h_{2,1beam1} & \cdots & h_{2,4beam4} \end{bmatrix}$$

Finally, because the network device has only the four radio frequency channels, traversal needs to be performed for $C_{16}^4$ times to find an optimal transmit-end analog narrow beam combination. The terminal device estimates corresponding information such as a PMI, an RI, and a CQI based on the combination, and reports the corresponding information.

Optionally, the network device adds the first indication information, the second indication information, and the third indication information to a channel state information measurement setting CSI-measurement setting, and sends the channel state information measurement setting to the terminal device, where the CSI-measurement setting includes the CSI-RS measurement configuration information.

Optionally, the CSI-RS measurement configuration information further includes fourth indication information, and the fourth indication information is used to indicate a plurality of channel state information-interference measurement CSI-IM resources.

The following provides an example. It may be understood that the present invention is not limited to this indication manner. For example, the first, second, and third indication information (the following example further includes fourth indication information) may be added to a CSI-process information element sent by the network device to the terminal device.

information or other configuration information. The following uses the CSI-RS measurement configuration information as an example for description.

The network device generates the channel state information-reference signal CSI-RS measurement configuration information, where the CSI-RS measurement configuration information includes the one or more CSI-RS resources, each CSI-RS resource includes quasi co-location QCL indication information, and the QCL indication information is used to indicate whether antenna ports in each CSI-RS resource have a similar channel large-scale property. The network device sends the CSI-RS measurement configuration information to the terminal device. The terminal device performs channel measurement on the plurality of CSI-RS resources based on the CSI-RS measurement configuration information.

Optionally, each CSI-RS resource further includes second indication information, and the second indication information is used to indicate beam index information of a plurality of CSI-RS ports that is sent by the network device, beam index information of a plurality of CSI-RS ports that is received by the terminal device, or beam pair information corresponding to the network device and the terminal.

It should be understood that the second indication information may be an information bit or an information element in each CSI-RS resource. For example, a new information bit, for example, "beam-indexList", may be defined in each CSI-RS resource. Each CSI-RS resource includes a plurality of CSI-RS ports. The information bit or the information element may be used to indicate the beam index information of the plurality of CSI-RS ports that is sent by the network device, the beam index information of the plurality of CSI-RS ports that is received by the terminal device, or the beam pair information corresponding to the network device

| CSI-Process information elements |
|---|

```
-- ASN1START
CSI-Process-r11 ::=            SEQUENCE {
    csi-ProcessId-r11              CSI-ProcessId-r11,
    beam-indexList                    SEQUENCE (SIZE (1..n)) OF INTEGER (1..n),
    csi-RS-ConfigNZPIdList-r11     CSI-RS-ConfigNZPId-r11,
    csi-IM-ConfigIdList-r11        CSI-IM-ConfigId-r11,
    csi-rs-bundType                INTEGER (1..n),
    ......
-- ASN1STOP
```

The information indication method in this embodiment of this application can be used to shorten a pilot measurement delay based on a plurality of analog beams, reduce pilot resource configuration overheads, and improve scheduling flexibility of the network device based on a plurality of analog beams.

Figure 3:
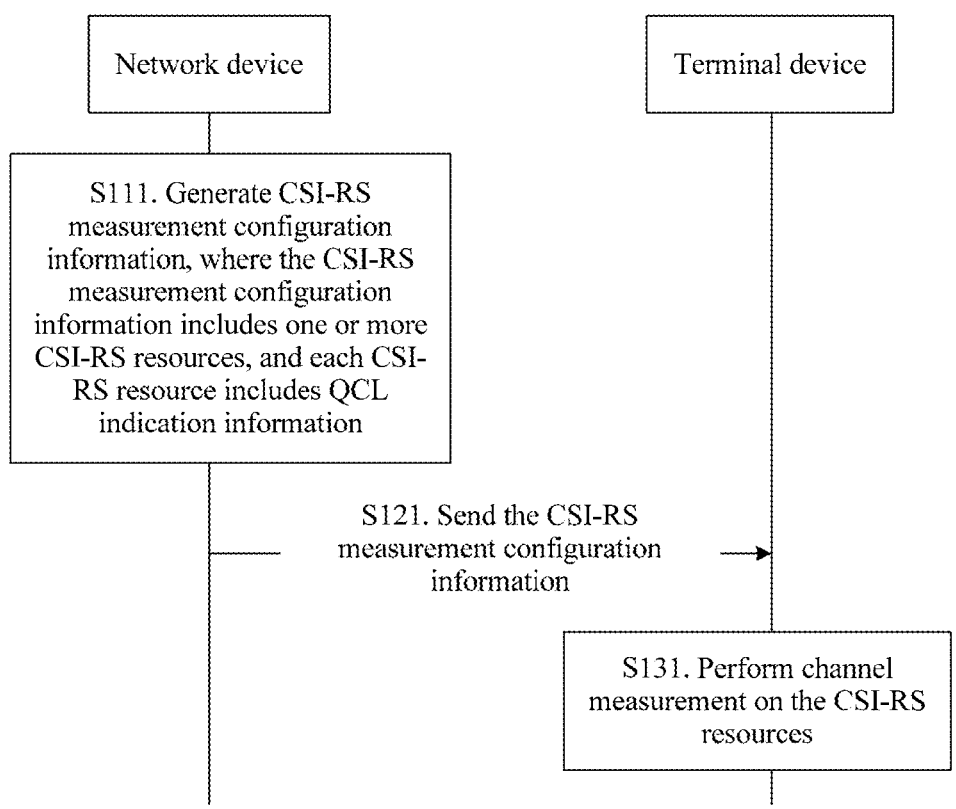
FIG. 3 is another schematic flowchart of an information indication method according to an embodiment of this application.

FIG. 3 is another schematic flowchart of an information indication method according to an embodiment of this application.

S111. A network device generates control information, where the control information includes one or more CSI-RS resources, and each CSI-RS resource includes quasi co-location QCL indication information.

S121. The network device sends the control information to the terminal device.

S131. The terminal device performs channel measurement on the one or more of CSI-RS resources based on the control information.

The control information may be channel state information-reference signal CSI-RS measurement configuration and the terminal. When the information bit or the information element is used to indicate the beam index information of the plurality of CSI-RS ports that is sent by the network device, the network device implicitly instructs the terminal device to receive the beam index information of the plurality of CSI-RS ports. When the information bit or the information element is used to indicate the beam index information of the plurality of CSI-RS ports that is received by the terminal device, the network device explicitly instructs the terminal device to receive the beam index information of the plurality of CSI-RS ports. When the information bit or the information element is used to indicate the beam pair information corresponding to the network device and the terminal, the information bit or the information element is used to not only indicate the beam index information of the plurality of CSI-RS ports that is sent by the network device, but also indicate the beam index information of the plurality of CSI-RS ports that is received by the terminal device.

It should be further understood that the QCL indication information may be an information bit or an information element in each CSI-RS resource. For example, a new information bit or information element, for example, a QCL flag "qcl-flag", may be defined in the CSI-RS resource. The information bit or the information element may be used to indicate whether antenna ports in each CSI-RS resource have a similar channel large-scale property.

Optionally, the network device adds the QCL indication information to a channel state information measurement setting CSI-measurement setting, and sends the channel state information measurement setting to the terminal device, where the CSI-measurement setting includes the CSI-RS measurement configuration information.

Optionally, when the QCL indication information is a first value, the QCL indication information is used to indicate that antenna ports in each CSI-RS resource have a similar channel large-scale property.

Optionally, when the QCL indication information is a second value, the QCL indication information is used to indicate that antenna ports in each CSI-RS resource do not have a similar channel large-scale property.

Optionally, when the QCL indication information is a third value, the QCL indication information is used to indicate that at least some antenna ports in each CSI-RS resource have a similar channel large-scale property.

For example, different values may be assigned to the "qcl-flag" information bit. Different values are used to indicate whether antenna ports in each CSI-RS resource have a similar channel large-scale property. Table 2 provides a specific implementation. It should be noted that a value in Table 2 is merely an example, and different values may also be assigned to qcl-flag to indicate corresponding meanings.

TABLE 2

| Value | Meaning description |
|---|---|
| 0 | All antenna ports included in each CSI-RS resource have a similar channel large-scale property, and channel measurement and estimation can be jointly performed. |
| 1 | All antenna ports included in each CSI-RS resource do not have a similar channel large-scale property, and channel measurement and estimation cannot be jointly performed. |
| 2 | Some antenna ports included in each CSI-RS resource have a similar channel large-scale property, and channel measurement |

TABLE 2-continued

| Value | Meaning description |
|---|---|
| | and estimation can be jointly performed for the antenna ports that have the similar channel large-scale property. |

Optionally, some antenna ports included in the CSI-RS resource have a similar channel large-scale property, each CSI-RS resource further includes QCL mapping port information, and the QCL mapping port information is used to indicate the antenna ports that have a similar channel large-scale property.

It should be understood that the QCL mapping port information may be an information bit in each CSI-RS resource. For example, a new information bit, for example, "qcl-mapping-antennatPort", may be defined in each CSI-RS resource. The information bit may be used to indicate antenna ports that have a similar channel large-scale property for joint channel estimation and measurement.

Optionally, "qcl-mapping-antennatPort" is used to indicate a QCL flag corresponding to each antenna port. For example, the QCL flag may be "qcl-index". It may be considered that antenna ports that have a same value of "qcl-index" have a similar channel large-scale property. In other words, channel measurement and estimation can be jointly performed.

Optionally, the channel large-scale property includes but is not limited to one or more of the following features: delay spread, Doppler spread, an average gain, and an average delay.

Optionally, the network device adds the QCL mapping port information to a channel state information measurement setting CSI-measurement setting, and sends the channel state information measurement setting to the terminal device, where the CSI-measurement setting includes the CSI-RS measurement configuration information.

The following provides an example. It may be understood that the present invention is not limited to this indication manner. For example, the QCL indication information (qcl-flag in the following) and the QCL mapping port information (qcl-mapping-antennaPort in the following) may be added to a CSI-RS-Config information element sent by the network device to the terminal device.

CSI-RS-Config information elements

```
-- ASN1START
CSI-RS-Config-r10 ::=                  SEQUENCE {
    csi-RS-r10                             CHOICE {
        release                                NULL,
        setup                                  SEQUENCE {
            antennaPortsCount-r10                  ENUMERATED {an1, an2, an4, an8},
            beam-indexList                         SEQUENCE (SIZE (1..n)) OF INTEGER (1..n)
                                                       OPTIONAL,           -- Need ON
            qcl-flag                               INTEGER (0,1,2),
            qcl-mapping-antennaPort                SEQUENCE (SIZE (1..8)) OF qcl-index
                                                       OPTIONAL,           -- Need ON
            resourceConfig-r10                     INTEGER (0..31),
            subframeConfig-r10                     INTEGER (0..154),
            p-C-r10                                INTEGER (-8..15)
        }
    }                                                                      OPTIONAL,--
Need ON
        zeroTxPowerCSI-RS-r10              ZeroTxPowerCSI-RS-Conf-r12       OPTIONAL
    -- Need ON
    }
    .........
-- ASN1STOP
```

Figure 4:
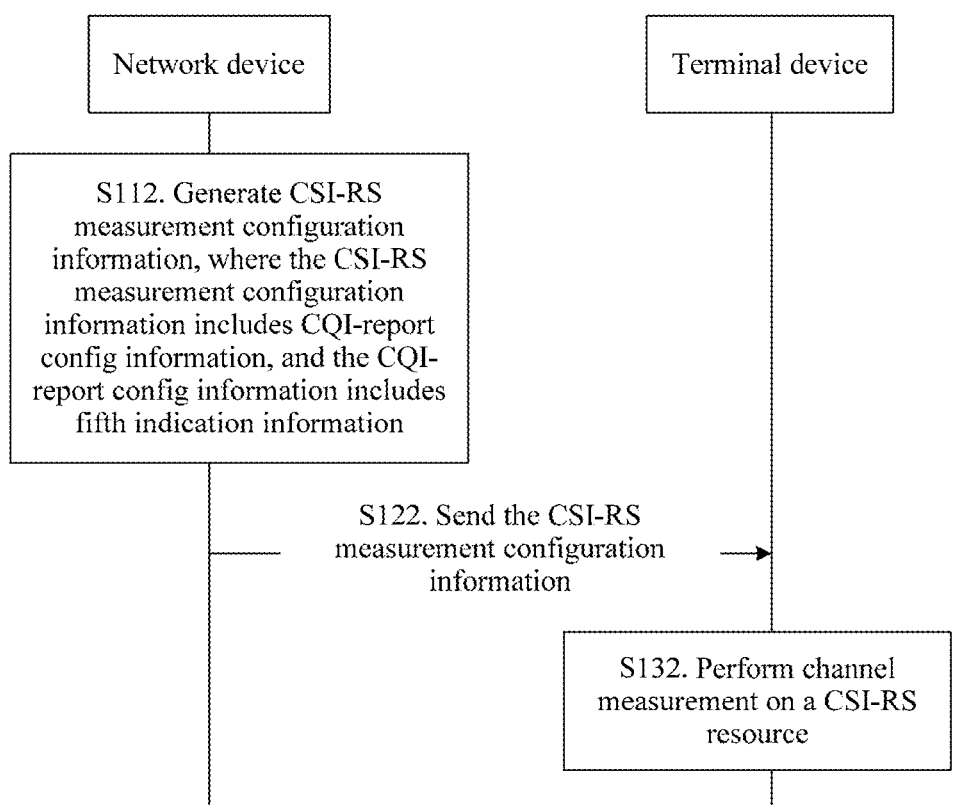
FIG. 4 is still another schematic flowchart of an information indication method according to an embodiment of this application.

FIG. 4 is still another schematic flowchart of an information indication method according to an embodiment of this application.

S112. A network device generates control information, where the control information includes channel quality information report configuration CQI-report config information.

S122. The network device sends CSI-RS measurement configuration information to a terminal device.

S132. The terminal device performs channel measurement on a CSI-RS resource based on the CSI-RS measurement configuration information.

The control information may be channel state information-reference signal CSI-RS measurement configuration information or other configuration information. The following uses the CSI-RS measurement configuration information as an example for description.

The network device generates the channel state information-reference signal CSI-RS measurement configuration information. The CSI-RS measurement configuration information includes one or more CSI-RS resources. The CSI-RS measurement configuration information further includes channel quality information report configuration CQI-report config information. The CQI-report config information includes fifth indication information. The fifth indication information is used to instruct the terminal device whether to feed back, to the network device, a value of interference from the outside of a serving cell. The network device sends the CSI-RS measurement configuration information to the terminal device. The terminal device performs channel measurement on the plurality of CSI-RS resources based on the CSI-RS measurement configuration information.

It should be understood that the fifth indication information may be an information bit in the CQI-report config information. For example, a new information bit "cqi-interference-out-of-cell" may be defined in the CQI-report config information. The information bit may be used to instruct the terminal device to feedback values of interference from the outside of a serving cell based on different analog beam weights. Mutual interference between different analog beams is inferred from an interference amount and a signal to interference plus noise ratio (Signal to Interference plus Noise Ratio, "SINR" for short) that is reported by the terminal device by using the CQI.

For example, different values may be assigned to the "cqi-interference-out-of-cell" information bit. Different values are used to indicate whether a value of interference from the outside of a serving cell is fed back to the network device. Table 3 provides a specific implementation.

TABLE 3

| Value | Meaning description |
|---|---|
| 0 | Do not feed back a value of interference from the outside of a serving cell. |
| 1 | Feed back a value of interference from the outside of a serving cell. |

Optionally, the network device infers a mutual interference amount between different analog beams. An interference amount from an analog beam 1 to an analog beam 2 is used as an example. The interference amount may be calculated by using the following formula:

$$I_{beam1\text{-}to\text{-}beam2} = SINR_{beam1} * I_{out\text{-}of\text{-}cell} / SINR_{beam2} * I_{out\text{-}of\text{-}cell}$$

$SINR_{beam1}$ represents a signal to interference plus noise ratio of the analog beam 1, $I_{out\text{-}of\text{-}cell}$ represents a value of interference from the outside of the serving cell, and $SINR_{beam2}$ represents a signal to interference plus noise ratio of the analog beam 2.

The following provides an example. It may be understood that the present invention is not limited to this indication manner. For example, the fifth indication information (for example, cqi-interference-out-of-cell in the following) may be added to a CQI-ReportConfig information element sent by the network device to the terminal device.

| CQI-ReportConfig information elements |
|---|
| ```
-- ASN1START
CQI-ReportConfig ::=                              SEQUENCE {
    cqi-ReportModeAperiodic                           CQI-ReportModeAperiodic      OPTIONAL,
-- Need OR
    nomPDSCH-RS-EPRE-Offset                           INTEGER (-1..6),
    cqi-ReportPeriodic                                CQI-ReportPeriodic OPTIONAL       --
Need ON
}
......
CQI-ReportPeriodic ::=                CHOICE {
    release                               NULL,
    setup                                 SEQUENCE {
        cqi-PUCCH-ResourceIndex               INTEGER (0..1185),
        cqi-interference-out-of-cell          INTERGER (0,1),
        cqi-pmi-ConfigIndex                   INTEGER (0..1023),
        cqi-FormatIndicatorPeriodic           CHOICE {
            widebandCQI                           NULL,
            subbandCQI                            SEQUENCE {
                k                                     INTEGER (1..4)
            }
        },
    }
}
CQI-ReportPeriodic-r10 ::=            CHOICE {
    release                               NULL,
    setup                                 SEQUENCE {
        cqi-PUCCH-ResourceIndex-r10           INTEGER (0..1184),
        cqi-PUCCH-ResourceIndexP1-r10         INTEGER (0..1184)
OPTIONAL,-- Need OR
        cqi-interference-out-of-cell          INTERGER (0,1),
        cqi-pmi-ConfigIndex                   INTEGER (0..1023),
``` |

| CQI-ReportConfig information elements |
|---|
| ```
            }
        }
        ......
        CQI-ReportPeriodicProcExt-r11 ::=           SEQUENCE {
            cqi-ReportPeriodicProcExtId-r11             CQI-ReportPeriodicProcExtId-r11,
            cqi-interference-out-of-cell                INTERGER (0,1),
            cqi-pmi-ConfigIndex-r11                     INTEGER (0..1023),
                                                                          OPTIONAL,      -- Need
ON
            ...,
            [[          cri-ReportConfig-r13            CRI-ReportConfig-r13            OPTIONAL
    -- Need ON
            ]],
            [[          periodicityFactorWB-r13         ENUMERATED {n2, n4}
OPTIONAL-- Need ON
            ]]
        }
        ......
        -- ASN1STOP
``` |

Figure 5A:
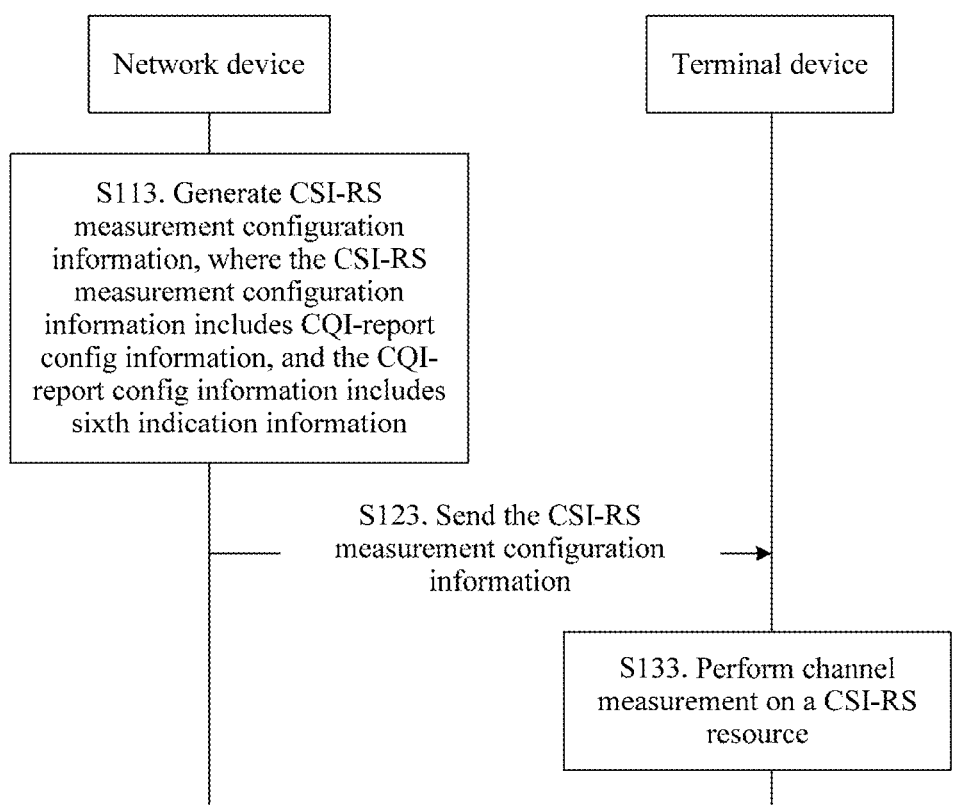
FIG. 5A is still another schematic flowchart of an information indication method according to an embodiment of this application.

FIG. 5A is still another schematic flowchart of an information indication method according to an embodiment of this application.

S113. A network device generates control information, where the control information includes channel quality information report configuration CQI-report config information.

S123. The network device sends the control information.

S133. A terminal device performs channel measurement on a CSI-RS resource based on the control information.

The control information may be channel state information-reference signal CSI-RS measurement configuration information or other configuration information. The following uses the CSI-RS measurement configuration information as an example for description.

The network device generates the channel state information-reference signal CSI-RS measurement configuration information. The CSI-RS measurement configuration information includes one or more CSI-RS resources. The CSI-RS measurement configuration information further includes channel quality information report configuration CQI-report config information. The CQI-report config information includes sixth indication information. The sixth indication information is used to instruct the terminal device to feed back channel time-domain angle-domain energy or channel frequency-domain angle-domain energy to the network device. The network device sends the CSI-RS measurement configuration information to the terminal device. The terminal device performs channel measurement on the plurality of CSI-RS resources based on the CSI-RS measurement configuration information.

It should be understood that the sixth indication information may be an information bit in the CQI-report config information. For example, a new information bit, for example, a CQI channel information type "cqi-channelInfor-type", may be defined in the CQI-report config information. The information bit may be used to instruct the terminal device to feed back channel time-domain angle-domain energy or channel time-domain angle-domain energy to the network device. A channel matrix is reconstructed for different analog beam weights or a same analog beam weight based on the channel time-domain angle-domain energy or the channel frequency-domain angle-domain energy that is reported by the terminal device by using the CQI, and a precoding matrix for a plurality of analog beam weighting combinations of a user and a maximum quantity of data transmissible layers of the user may be obtained and scheduled based on the reconstructed channel matrix.

For example, different values may be assigned to the "cqi-channelInfor-type" information bit. Different values are used to instruct the terminal device to feed back the channel time-domain angle-domain energy or the channel frequency-domain angle-domain energy to the network device. Table 4 provides a specific implementation.

TABLE 4

| Value | Meaning description |
|---|---|
| 0 | Do not feed back explicit channel information. |
| 1 | Feed back channel time-domain angle-domain energy. |
| 2 | Feed back channel frequency-domain angle-domain energy. |

The following uses an example of feeding back the channel time-domain angle-domain energy to describe a processing process of reconstructing the channel matrix by the network device.

$$H_{Angular} = H_{space} \times U$$

$$H_{Angular} = H_{space} \times \left[\varepsilon(0), \varepsilon\left(\frac{1}{N_{tx}}\right), \ldots, \varepsilon\left(\frac{1}{N_{tx}}\right), \ldots, \varepsilon\left(\frac{N_{tx}-1}{N_{tx}}\right)\right] = \left[H_{space} \times \varepsilon(0), H_{space} \times \varepsilon\left(\frac{1}{N_{tx}}\right), \ldots, H_{space} \times \varepsilon\left(\frac{N_{tx}-1}{N_{tx}}\right)\right]$$

A description of a matrix $U$ is as follows:

$$U = \left[\varepsilon(0), \varepsilon\left(\frac{1}{N_{tx}}\right), \ldots, \varepsilon\left(\frac{N_{tx}-1}{N_{tx}}\right)\right]$$

$$\varepsilon(n) = \begin{bmatrix} 1 \\ \exp(-j2\pi n) \\ \ldots \\ \exp(-j2\pi n(N_{tx}-1)) \end{bmatrix}$$

The network device reconstructs channel information by using an obtained angle-domain energy value $H_{Angular}(:,j)=1:N_{tx}$ and a feature of the matrix $U$:

$$H_{space} = H_{Angular} \times U^H$$

$$U \times U^H = I$$

$H_{Angular}$ represents a channel time-domain angle-domain energy matrix, $H_{space}$ represents a reconstructed channel matrix, and $N_{tx}$ represents a quantity of transmit antennas of the network device.

The following provides an example. It may be understood that the present invention is not limited to this indication manner. For example, the sixth indication information (for example, cqi-channelInfor-type in the following) may be added to a CSI-ReportConfig information element sent by the network device to the terminal device.

content based on the plurality of CSI-RS resource(s) are also different. In the existing LTE-A protocol, for a beamformed CSI-RS measurement configuration, one CSI measurement configuration includes a plurality of NZP CSI-RS resource configurations. However, in a system, by default, only one NZP CSI-RS resource configuration is selected from the plurality of NZP CSI-RS resource configurations, and measurement, calculation, and feedback of CSI report content are implemented based on the selected NZP CSI-RS resource. The existing implementation is not applicable to

| CQI-ReportConfig information elements |
|---|
| ```
-- ASN1START
CQI-ReportConfig ::=                            SEQUENCE {
    cqi-ReportModeAperiodic                         CQI-ReportModeAperiodic      OPTIONAL,
-- Need OR
    nomPDSCH-RS-EPRE-Offset                         INTEGER (-1..6),
    cqi-ReportPeriodic                              CQI-ReportPeriodic           OPTIONAL      --
Need ON
}
......
CQI-ReportPeriodic ::=                          CHOICE {
    release                                         NULL,
    setup                                           SEQUENCE {
        cqi-PUCCH-ResourceIndex                         INTEGER (0..1185),
        cqi-channelInfor-flag                           INTERGER (0,1),
        cqi-pmi-ConfigIndex                             INTEGER (0..1023),
        cqi-FormatIndicatorPeriodic                     CHOICE {
            widebandCQI                                     NULL,
            subbandCQI                                      SEQUENCE {
                k                                               INTEGER (1..4)
            }
        },
        ri-ConfigIndex                                  INTEGER (0..1023)        OPTIONAL, --
Need OR
        simultaneousAckNackAndCQI                       BOOLEAN
    }
}
CQI-ReportPeriodic-r10 ::=                      CHOICE {
    release                                         NULL,
    setup                                           SEQUENCE {
        cqi-PUCCH-ResourceIndex-r10                     INTEGER (0..1184),
        cqi-PUCCH-ResourceIndexP1-r10                   INTEGER (0..1184)
OPTIONAL,-- Need OR
        cqi-channelInfor-type                       INTERGER (0,1),
        cqi-pmi-ConfigIndex                             INTEGER (0..1023),
        ......
    }
}
......
CRI-ConfigIndex-r13 ::=                         INTEGER (0..1023)
-- ASN1STOP
``` |

Figure 5B:
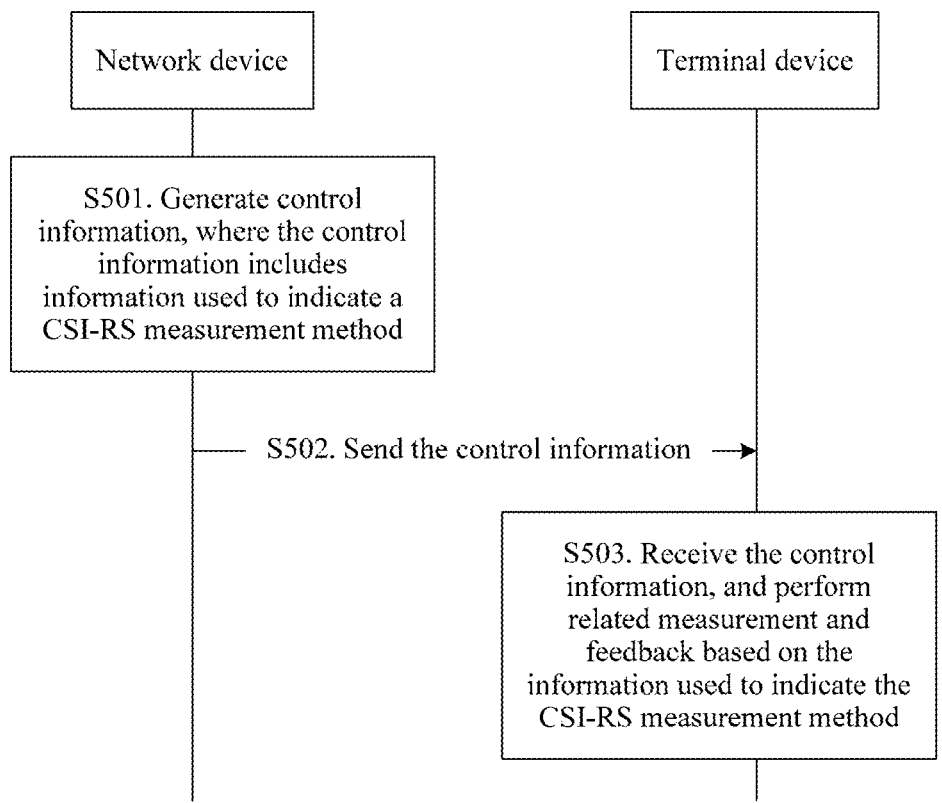
FIG. 5B is still another schematic flowchart of an information indication method according to an embodiment of this application.

FIG. 5B is still another schematic flowchart of an information indication method according to an embodiment of this application.

Currently, a configuration architecture of CSI obtaining and beam management has been agreed on the existing RAN1 meeting. To be specific, one channel state information measurement setting (CSI measurement setting) is configured for one terminal. One CSI measurement setting includes one or more links (links). Each link corresponds to one channel state information report setting (CSI reporting setting) and one resource setting (Resource setting). Each resource setting includes one or more channel state information-reference signal resource sets (CSI-RS resource set(s)). Each CSI-RS resource set(s) includes one or more channel state information-reference signal resources CSI-RS resource(s).

In other words, one CSI reporting setting corresponds to one or more CSI-RS resource(s). In different scenarios, requirements for obtaining CSI measurement and report requirements, in different scenarios based on a common CSI configuration architecture, discussed in a new radio (new radio, NR) technology.

This embodiment of the present invention is to provide a common CSI measurement or beam management configuration architecture for NR to implement CSI measurement requirements in different scenarios. A core idea of this embodiment of the present invention is to predefine a set of CSI measurement and feedback rules, and explicitly or implicitly notify the terminal device of the rules in a specific manner, so that the terminal device performs CSI measurement according to the rules.

For example, a possible application scenario 1 is CSI measurement and feedback based on a low frequency band (a frequency less than 6 GHz).

For a conventional mobile communications service on a low frequency band, the network device may configure a pilot (which is equivalent to a reference signal in this specification, where only names are different) for the terminal device by using one or more CSI-RS resources or CSI-RS resource sets. The terminal device needs to aggregate the one or more CSI-RS resources or all CSI-RS ports to perform CSI measurement, and feed back a measurement result to the network device.

For example, it is assumed that the network device configures a CSI-RS resource 0 and a CSI-RS resource 1 (or configures a CSI-RS resource set 0 and a CSI-RS resource set 1) for the terminal device. Each CSI-RS resource or CSI-RS resource set includes configuration information of two ports. In this case, the terminal device needs to aggregate and process a measurement result of the CSI-RS resource 0 and that of the CSI-RS resource 1, and generate CSI feedback information based on aggregated channel information. A PMI is used as an example to describe how the terminal device aggregates the measurement result of the CSI-RS resource 0 and that of the CSI-RS resource 1.

A. First, the terminal device separately obtains a channel matrix of the CSI-RS resource 0 and that of the CSI-RS resource 1, as shown in the following:

$$H_{CSI-RS0} = \begin{bmatrix} h_{1,port_1} & h_{1,port_2} \\ h_{2,port_1} & h_{2,port_2} \end{bmatrix}$$

$$H_{CSI-RS1} = \begin{bmatrix} h_{1,port_3} & h_{1,port_4} \\ h_{2,port_3} & h_{2,port_4} \end{bmatrix}$$

B. The terminal device combines the channel matrix of the CSI-RS resource 0 and that of the CSI-RS resource 1:

$$H = \begin{bmatrix} h_{1,port_1} & h_{1,port_2} & h_{1,port_3} & h_{1,port_4} \\ h_{2,port_1} & h_{2,port_2} & h_{2,port_3} & h_{2,port_4} \end{bmatrix}$$

C. The terminal device obtains a PMI based on a combined matrix H. For a specific obtaining process, refer to description in the prior art. Details are not described herein.

It should be understood that, in the scenario 1, the terminal device needs to aggregate all the CSI-RS resources, and feed back CSI information based on all the CSI-RS resources after the aggregation.

For another example, another possible application scenario 2 is CSI aggregation measurement and feedback based on an analog beam.

In beam management, the network device configures N analog beams for the terminal device, and the terminal device implements subsequent CSI measurement and feedback based on the configured N analog beams.

For example, it is assumed that the network device has only two radio frequency ports. In beam management, the network device configures two analog beams for the terminal device. In this case, four correspondences exist between the two radio frequency ports and the two analog beams. For example, a port 1 corresponds to a beam 1, a port 1 corresponds to a beam 2, and so on. The network device configures two CSI-RS resources for the terminal device, for example, a CSI-RS resource 0 and a CSI-RS resource 1. Each CSI-RS resource includes two ports and corresponds to one analog beam. During CSI measurement, the terminal device needs to traverse all combinations of all radio frequency ports and analog beams, as shown in the following:

Herein, $H_1$ represents a channel matrix, between a transmit antenna and a receive antenna, obtained through measurement by the terminal, when the first radio frequency port carries an analog beam 2, and the second radio frequency port carries the analog beam 2.

Herein, $H_2$ represents a channel matrix, between a transmit antenna and a receive antenna, obtained through measurement by the terminal, when the first radio frequency port carries the analog beam 2, and the second radio frequency port carries an analog beam 3.

Herein, $H_3$ represents a channel matrix, between a transmit antenna and a receive antenna, obtained through measurement by the terminal, when the first radio frequency port carries the analog beam 3, and the second radio frequency port carries the analog beam 3.

Herein, $H_4$ represents a channel matrix, between a transmit antenna and a receive antenna, obtained through measurement by the terminal, when the first radio frequency port carries the analog beam 3, and the second radio frequency port carries the analog beam 2.

$$H_1 = \begin{bmatrix} h_{1,beam_2} & h_{1,beam_2} \\ h_{2,beam_2} & h_{2,beam_2} \end{bmatrix}$$

$$H_2 = \begin{bmatrix} h_{1,beam_2} & h_{1,beam_3} \\ h_{2,beam_2} & h_{2,beam_3} \end{bmatrix}$$

$$H_3 = \begin{bmatrix} h_{1,beam_3} & h_{1,beam_3} \\ h_{2,beam_3} & h_{2,beam_3} \end{bmatrix}$$

$$H_4 = \begin{bmatrix} h_{1,beam_3} & h_{1,beam_2} \\ h_{2,beam_3} & h_{2,beam_2} \end{bmatrix}$$

The terminal device separately calculates channel quality corresponding to the four channel matrices, for example, information such as a CQI, a PMI, an RI, RSRP, and RSRQ, selects best channel quality and a corresponding association channel of a radio frequency port and an analog beam, and feeds back these to the network device. A specific indication manner of the association channel of the radio frequency port and the analog beam includes: indicating a corresponding analog beam by using a CSI-RS resource index.

For another example, another possible application scenario 3 is aggregation measurement and feedback of coordinated transmission by a plurality of transmission reception points (TRP).

For the multi-TRP coordinated transmission scenario, it is assumed that CSI-RS resources of different TRPs are configured for the terminal device by using a plurality of CSI-RS resources or resource sets, and a corresponding CSI measurement method needs to be selected based on a current data transmission mode of the terminal device.

For example, when the terminal device selects one TRP to perform data transmission, during CSI measurement, one or more CSI-RS resources corresponding to a serving TRP need to be used for channel measurement, and one or more CSI-RS resources corresponding to another coordinated TRP need to be used for interference measurement; when the terminal device selects a plurality of TRPs for joint data transmission, during CSI measurement, one or more CSI-RS resources corresponding to a plurality of serving TRPs need to be used for channel measurement, and one or more CSI-RS resources corresponding to other coordinated TRPs need to be used for interference measurement. A specific implementation is configuring, in a CSI-RS measurement configuration, a measurement attribute of each CSI-RS resource or CSI-RS set, where the measurement attribute includes channel measurement and interference measurement. The terminal device implements CSI measurement and feedback based on the measurement attribute of each CSI-RS resource or CSI-RS resource set.

For the foregoing mentioned three possible application scenarios, an embodiment of the present invention provides a CSI measurement method. The method includes the following steps:

S501. A network device generates control information, where the control information includes information used to indicate a measurement method of a plurality of CSI-RS resources.

S502. Send the control information to a terminal device.

S502. The terminal device receives the control information, and performs corresponding measurement based on the indicated measurement method of the plurality of CSI-RS resources.

Optionally, the control information in S501 may be added to a configuration message of a link link and sent to the terminal device; or may be added to a configuration message of a report setting and sent to the terminal device; or may be added to a configuration message of beam management and sent to the terminal device; or may be added to a configuration message of a CSI-RS resource and sent to the terminal device.

Optionally, when the control information is a first value, the control information is used to instruct the terminal device to jointly perform CSI measurement and feedback based on all ports of the plurality of CSI-RS resources configured by the network device.

Optionally, when the control information is a second value, the control information is used to instruct the terminal device to traverse all ports of the plurality of configured CSI-RS resources, select a strongest radio frequency port, and perform CSI measurement and feedback based on the radio frequency port and an analog beam.

Optionally, when the control information is a third value, the control information is used to instruct the terminal device to perform CSI measurement and feedback with reference to a measurement attribute (for example, channel measurement and interference measurement) of each CSI-RS resource.

For example, Table 5 provides a specific implementation.

TABLE 5

| Value | Measurement method of a plurality of CSI-RS resources |
|---|---|
| 0 | The terminal device jointly performs CSI measurement and feedback based on all ports of a plurality of configured CSI-RS resources. |
| 1 | The terminal device traverses all ports of a plurality of configured CSI-RS resources, selects a strongest port, and performs CSI measurement and feedback based on the strongest port and a beam. |
| 2 | In the multi-TRP coordinated transmission mode, the terminal device performs measurement and feedback with reference to a measurement attribute of each CSI-RS resource configuration, where the measurement attribute is channel measurement and interference measurement. |

In another possible implementation, the network device may implicitly indicate the measurement method of the plurality of CSI-RS resources. For example, as shown in Table 6, the terminal device indirectly obtains measurement mode information by obtaining transmission mode information based on information about a mapping relationship between a transmission mode of the terminal device and the measurement method of the plurality of CSI-RS resources.

TABLE 6

| Transmission mode of the terminal device | Measurement method of the plurality of CSI-RS resources |
|---|---|
| Multi-TRP coordinated transmission mode | The terminal device performs measurement and feedback with reference to a measurement attribute of each CSI-RS resource configuration, where the measurement attribute is channel measurement and interference measurement. |
| Single cell transmission mode based on a high-frequency analog beam | The terminal device traverses all ports of a plurality of configured CSI-RS resources, selects a strongest port, and performs CSI measurement and feedback based on the strongest port and a beam. |
| Single cell transmission mode based on a low-frequency wide beam | The terminal device jointly performs CSI measurement and feedback based on all ports of a plurality of configured CSI-RS resources. |

The information about the mapping relationship between the transmission mode of the terminal device and the measurement mode of the terminal device may be dynamically sent by the network device to the terminal device, or may be preconfigured or prestored on the terminal device. In this implementation, the information used to indicate the measurement mode of the terminal device is transmission mode information of the terminal device.

The transmission mode information may be sent by the network device to the terminal device by using signaling, or may be obtained by the terminal device.

Figure 5C:
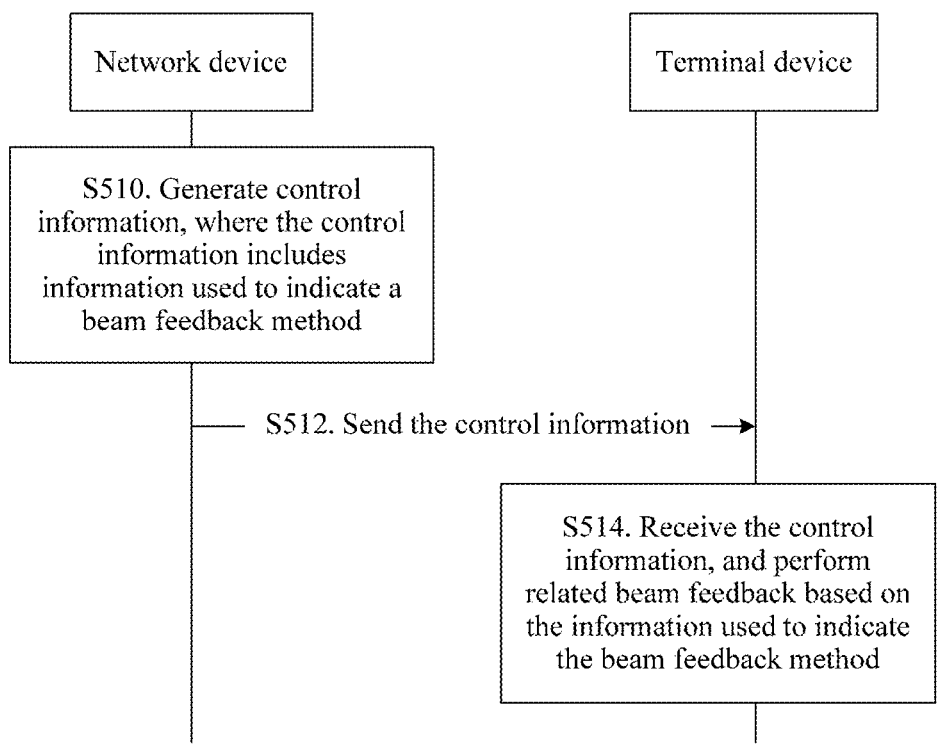
FIG. 5C is still another schematic flowchart of an information indication method according to an embodiment of this application.

FIG. 5C is still another schematic flowchart of an information indication method according to an embodiment of this application.

Currently, a configuration architecture of CSI obtaining and beam management has been agreed on the existing RAN1 meeting. To be specific, one channel state information measurement setting (CSI measurement setting) is configured for one terminal. One CSI measurement setting includes one or more links (links). Each link corresponds to one channel state information report setting (CSI reporting setting) and one resource setting (Resource setting). Each resource setting includes one or more channel state information-reference signal resource sets (CSI-RS resource set(s)). Each CSI-RS resource set(s) includes one or more channel state information-reference signal resources CSI-RS resource(s).

In other words, one CSI reporting setting corresponds to one or more CSI-RS resource(s). In different scenarios, requirements for obtaining CSI measurement and report content based on the plurality of CSI-RS resource(s) are also different. In the existing LTE-A protocol, for a beamformed CSI-RS measurement configuration, one CSI measurement configuration includes a plurality of NZP CSI-RS resource configurations. However, in a system, by default, only one NZP CSI-RS resource configuration is selected from the plurality of NZP CSI-RS resource configurations, and measurement, calculation, and feedback of CSI report content are implemented based on the selected NZP CSI-RS resource. The existing implementation is not applicable to requirements, in different scenarios based on a common CSI configuration architecture, discussed in a new radio (new radio, NR) technology.

This embodiment of the present invention is to provide a common CSI measurement or beam management configuration architecture for NR to implement beam measurement requirements in different scenarios. A core idea of this embodiment of the present invention is to predefine a set of beam measurement rules, and explicitly or implicitly notify the terminal device of the rules in a specific manner, so that the terminal device performs beam measurement according to the rules.

For example, a possible scenario 1 is beam measurement required by a network device and a terminal device.

When the terminal device moves at a high speed, a plurality of beams with a relatively low spatial correlation are fed back to the network device, to support a robust transmission requirement of the terminal device moving at a high speed. When the terminal device moves at a low speed, a plurality of beams with a relatively high spatial correlation are fed back to the network device, to support closed-loop multi-user MIMO, thereby improving a data transmission rate of the system.

For another example, another possible scenario 2 is beam measurement based on multi-TRP coordination.

In a scenario based on multi-TRP coordinated transmission, there are three data transmission manners, including dynamic node selection (the dynamic node selection means to select only one of TRPs to perform data transmission), joint transmission (the joint transmission means to select a plurality of TRPs to perform same data transmission), and incoherent joint transmission (the incoherent joint transmission means to select a plurality of TRPs to perform different data transmission).

If a plurality of CSI-RS resources or sets of different TRPs are configured for the terminal device, and only one TRP is used to perform data transmission, a beam obtaining process is as follows:

Step 1: The terminal device selects a best serving TRP based on measurement results of the plurality of CSI-RS resources or sets.

Step 2: Select N report beams based on the selected TRP, a corresponding CSI-RS resource, and the measurement results.

If a plurality of CSI-RS resources or sets of different TRPs are configured for the terminal device, when data transmission is performed by using the plurality of TRPs, measurement is performed on all the CSI-RS resources or resource sets corresponding to the plurality of TRPs, and N report beams are selected from the CSI-RS resources or resource sets.

For another example, another possible scenario 3 is initial access beam measurement.

During initial access of the terminal device, the network device does not have any information about the terminal device, and cannot guide the terminal device to select a report beam. Therefore, the terminal device needs to independently determine to select N beams for measurement and reporting, or predetermine a rule, for example, select N beams with a lowest correlation for measurement and reporting.

Based on requirements of the foregoing three different scenarios, a beam measurement and feedback rule needs to be defined for 5G NR. The rule may be explicitly or implicitly indicated to the terminal device. An embodiment of the present invention provides a beam feedback method. The method includes:

S510. A network device generates control information, where the control information includes information used to indicate a beam feedback method to a terminal device.

S512. Send the control information to the terminal device.

S514. The terminal device receives the control information, and performs corresponding feedback based on the indicated beam feedback method.

Optionally, the control information in S501 may be added to a measurement configuration measurement setting message and sent to the terminal device; or may be added to a configuration message of a report setting and sent to the terminal device; or may be added to a configuration message of a CSI-RS resource setting or a resource set or a resource and sent to the terminal device.

Optionally, when the control information is a first value, the control information is used to instruct the terminal device to select N strongest beams from all CSI-RS resource configurations for measurement, and report measurement results, where N is greater than or equal to 1.

Optionally, when the control information is a second value, the control information is used to instruct to select N beams from a CSI-RS resource or a CSI-RS resource set for measurement, and report a measurement result.

Optionally, when the control information is a third value, the control information is used to instruct the terminal device to select beams with a high spatial correlation for reporting.

Optionally, when the control information is a fourth value, the control information is used to instruct the terminal device to select beams with a low spatial correlation for reporting.

Optionally, when the control information is a fifth value, the control information is used to instruct the terminal device to independently determine a report beam selection method.

For example, Table 6 provides a specific implementation.

TABLE 6

| Value | Beam feedback method |
|---|---|
| 1 | Select N strongest beams from all CSI-RS resource configurations for measurement, and report measurement results. |
| 2 | Select N beams from a CSI-RS resource or a CSI-RS resource set for measurement, and report a measurement result. |
| 3 | Select and report beams with a high spatial correlation. |
| 4 | Select and report beams with a low spatial correlation. |
| 5 | Independently determine a report beam selection method. |

The value may alternatively be a type field, an ID number, a bitmap, or another field. No order and no necessary dependence exist between these values. When the first column field in Table 6 is a type, it may be understood that a type 1 corresponds to selecting N strongest beams from all CSI-RS resource configurations for measurement and reporting measurement results, a type 2 corresponds to selecting N beams from a CSI-RS resource or a CSI-RS resource set for measurement and reporting measurement results, and so on. Details are not described.

In addition to the foregoing explicit indication method, a beam feedback method may be implicitly indicated, for example:

The network device configures a mapping relationship between the transmission mode of the terminal and the beam feedback method, and sends the mapping relationship to the terminal device. After obtaining the transmission mode of the terminal, the terminal may obtain the beam feedback method based on the foregoing mapping relationship. As shown in Table 7:

TABLE 7

| Transmission mode of the terminal | Beam feedback method |
|---|---|
| First transmission mode | Report N strongest beams with a relatively low correlation to the network device. |
| Second transmission mode | Report N strongest beams with a relatively high correlation to the network device. |

The transmission mode of the terminal may be an SFBC mode or a CL-MIMO mode.

In addition to the foregoing implicit indication method, the terminal device may further independently determine a report beam. For example, when the terminal device has poor channel quality or moves at a high speed, N strongest beams with a relatively low correlation are reported to the network device; when the terminal device has relatively good channel quality or moves at a low speed, N strongest beams with a relatively high correlation are reported to the network device. A specific rule of determining may be indicated by the network device to the terminal by using another message, or use a predefined default rule.

Based on the RAN1 #88 meeting, a receive end performs grouping processing on transmit beams of a transmit end (in downlink, the receive end is a terminal device, and the transmit end is a network device; in uplink, the receive end is a network device, and the transmit end is a terminal device). The foregoing described indication information may include one or more features used to indicate a selected beam in a group, or between groups, or in a group and between groups. The indication information may be configured by the network device for UE, or may be added to the indication information for the network device when the UE reports the indication information.

With reference to FIG. 2 to FIG. 5C, the foregoing describes the embodiments of this application separately from perspectives of a network device, a terminal device, and an interaction between a network device and a terminal device. It may be understood that, to implement the foregoing functions, the devices such as the network device and the terminal device include a corresponding hardware structure and/or functional module that is used to perform each function. A person skilled in the art should be easily aware that units and method steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
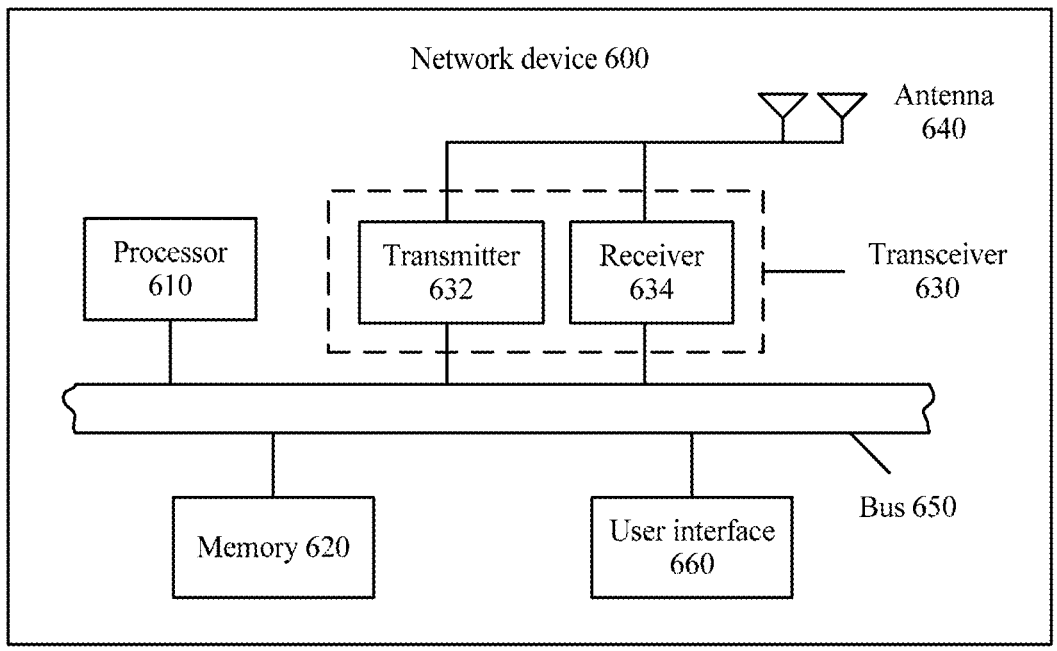
FIG. 6 is a schematic block diagram of an information indication network device according to an embodiment of this application.

FIG. 6 is a schematic diagram of a network device. The network device may be applied to the system shown in FIG. 1. The network device 600 includes a processor 610, a memory 620, a transceiver 630, an antenna 640, a bus 650, and a user interface 660.

Specifically, the processor 610 controls an operation of the network device 600, for example, controls the network device 600 to perform S110, S111, S112, or S113. For details, refer to the description in the method embodiments, and details are not described herein again. The processor may be a general-purpose processor, a digital signal processor, an application-specific integrated circuit, a field-programmable gate array, or another programmable logic component.

The transceiver 630 is configured to communicate with a terminal device, for example, may perform S120, S121, S122, or S123. For details, refer to the description in the method embodiments, and details are not described herein again. The transceiver 630 includes a transmitter 632 and a receiver 634. The transmitter 632 is configured to transmit a signal, and the receiver 634 is configured to receive a signal. There may be one or more antennas 640. The network device 600 may further include the user interface 660, for example, a keyboard, a microphone, a speaker, and/or a touchscreen.

The user interface 660 may transfer content and a control operation to the network device 600.

Components of the network device 600 are coupled together by using the bus 650. In addition to a data bus, the bus system 650 further includes a power bus, a control bus, and a status signal bus. However, for clear description, various types of buses in the figure are marked as the bus system 650. It should be noted that the foregoing descriptions of the network device structure may be applied to the method embodiments in this application.

The memory 620 may include a read-only memory ("ROM" for short) and a random access memory ("RAM" for short), or another type of dynamic storage device that may store information and an instruction; or may be a magnetic disk memory. The memory 620 may be configured to store an instruction for implementing a related method provided in the embodiments of this application. It may be understood that an executable instruction is programmed or loaded to at least one of the processor 610, a cache, or a long-term memory of the network device 600.

In a specific embodiment, the memory is configured to store computer executable program code. When the program code includes an instruction, and when the processor executes the instruction, the instruction enables the network device to perform an operation in the method embodiments. For details, refer to the description in the method embodiments, and details are not described herein again.

Figure 7:
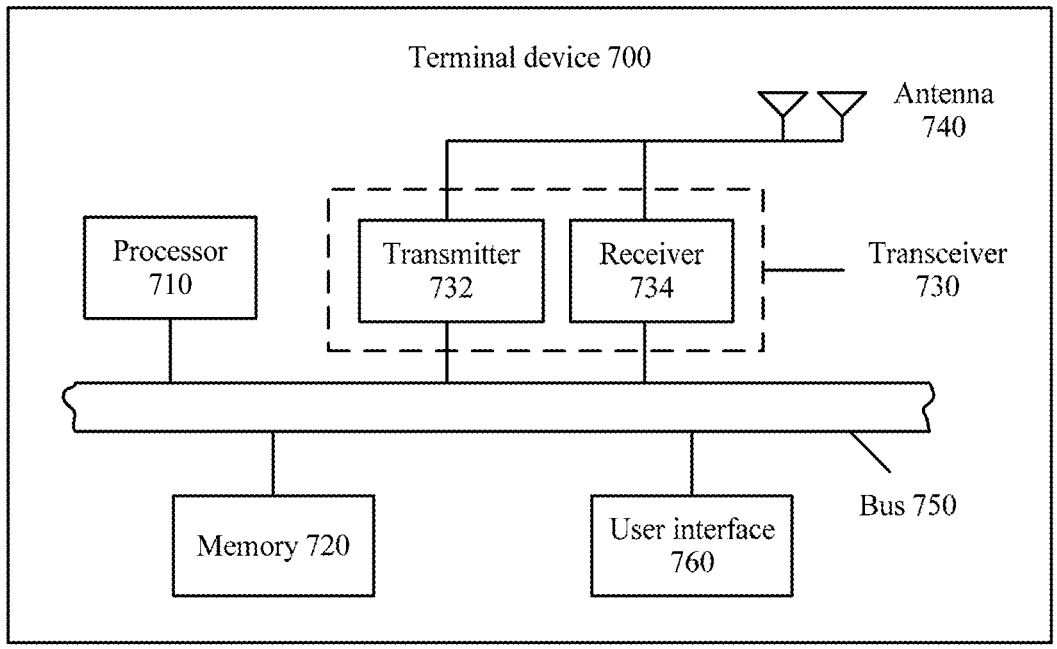
FIG. 7 is a schematic block diagram of an information indication terminal device according to an embodiment of this application.

FIG. 7 is a schematic block diagram of an information indication terminal device 700 according to an embodiment of this application. The terminal device may be applied to the system shown in FIG. 1. The terminal device 700 includes a processor 710, a memory 720, a transceiver 730, an antenna 740, a bus 750, and a user interface 760.

Specifically, the processor 710 controls an operation of the terminal device 700, for example, controls the terminal device 700 to perform S130, S131, S132, or S133. For details, refer to the description in the method embodiments, and details are not described herein again. The processor may be a general-purpose processor, a digital signal processor, an application-specific integrated circuit, a field-programmable gate array, or another programmable logic component.

The transceiver 730 is configured to communicate with a terminal device, for example, may perform S120, S121, S122, or S123. For details, refer to the description in the method embodiments, and details are not described herein again. The transceiver 730 includes a transmitter 732 and a receiver 734. The transmitter 732 is configured to transmit a signal, and the receiver 734 is configured to receive a signal. There may be one or more antennas 740. The terminal device 700 may further include the user interface 760, for example, a keyboard, a microphone, a speaker, and/or a touchscreen. The user interface 760 may transfer content and a control operation to the terminal device 700.

Components of the terminal device 700 are coupled together by using the bus 750. In addition to a data bus, the bus system 750 further includes a power bus, a control bus, and a status signal bus. However, for clear description, various types of buses in the figure are marked as the bus system 750. It should be noted that the foregoing descriptions of the terminal device structure may be applied to the embodiments in this application.

The memory 720 may include a read-only memory "ROM" for short) and a random access memory ("RAM" for short), or another type of dynamic storage device that may store information and an instruction; or may be a magnetic disk memory. The memory 720 may be configured to store an instruction for implementing a related method provided in the embodiments of this application. It may be understood that an executable instruction is programmed or loaded to at least one of the processor 710, a cache, or a long-term memory of the terminal device 700.

In a specific embodiment, the memory is configured to store computer executable program code. When the program code includes an instruction, and when the processor executes the instruction, the instruction enables the terminal device to perform an operation in the method embodiments. For details, refer to the description in the method embodiments, and details are not described herein again.

It may be clearly understood by a person skilled in the art that, for convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, such as a server or a data center. The usable medium may be a magnetic medium (for example, a floppy disk, a hard disk, or a magnetic tape), an optical medium (for example, DVD), a semiconductor medium (for example, a Solid State Disk (SSD)), or the like.

The foregoing descriptions are merely specific implementations of this application. However, the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information sending method, comprising:
generating, by a network device, control information, wherein the control information comprises first indication information, second indication information, and third indication information, wherein
the first indication information is used to indicate a plurality of channel state information-reference signal (CSI-RS) resources,
the second indication information is used to indicate at least one piece of the following information:
beam index information of the plurality of CSI-RS resources sent by the network device, beam index information of the plurality of CSI-RS resources received by a terminal device, or beam pair information corresponding to the network device and the terminal, and
the third indication information is used to indicate a measurement method of the plurality of CSI-RS resources;
adding, by the network device, the control information to a channel state information measurement setting; and
sending, by the network device, the control information to the terminal device by sending the control information measurement setting to the terminal device.

2. The method according to claim 1, wherein the control information further comprises fourth indication information, and the fourth indication information is used to indicate a plurality of channel state information-interference measurement (CSI-IM) resources.

3. The method according to claim 1, wherein the network device adds the first indication information, the second indication information, and the third indication information to the channel state information measurement setting.

4. The method according to claim 1, wherein when the third indication information is a first value, the third indication information is used to instruct the terminal device to separately perform channel measurement on the plurality of CSI-RS resources and feed back measurement information corresponding to all the CSI-RS resources.

5. The method according to claim 1, wherein when the third indication information is a second value, the third indication information is used to instruct the terminal device to separately perform channel measurement on the plurality of CSI-RS resources and feed back measurement information corresponding to one CSI-RS resource or first several CSI-RS resources with best channel quality.

6. The method according to claim 1, wherein when the third indication information is a third value, the third indication information is used to instruct the terminal device to separately perform channel measurement on the plurality of CSI-RS resources and combine channel matrices obtained after estimation is performed on the plurality of CSI-RS resources.

7. The method according to claim 1, wherein each CSI-RS resource comprises quasi co-location (QCL) indication information, and the QCL indication information is used to indicate whether antenna ports in each CSI-RS resource have a similar channel large-scale property.

8. An information receiving method, comprising:
receiving, by a terminal device, control information sent by a network device, wherein the control information is received by way of a channel state information management setting, and the control information comprises first indication information, second indication information, and third indication information, wherein
the first indication information is used to indicate a plurality of channel state information-reference signal (CSI-RS) resources,
the second indication information is used to indicate at least one piece of the following information:
beam index information of the plurality of CSI-RS resources that is sent by the network device, beam index information of the plurality of CSI-RS resources that is received by the terminal device, or beam pair information corresponding to the network device and the terminal, and
the third indication information is used to indicate a measurement method of the plurality of CSI-RS resources; and
performing, by the terminal device, channel measurement on the plurality of CSI-RS resources based on the control information.

9. The method according to claim 8, wherein the control information further comprises fourth indication information, and the fourth indication information is used to indicate a plurality of channel state information-interference measurement (CSI-IM) resources.

10. The method according to claim 8, wherein the terminal device receives the first indication information, the second indication information, and the third indication information by way of the channel state information measurement setting.

11. The method according to claim 8, wherein when the third indication information is a first value, the third indication information is used to instruct the terminal device to separately perform channel measurement on the plurality of CSI-RS resources and feed back measurement information corresponding to all the CSI-RS resources.

12. The method according to claim 8, wherein when the third indication information is a second value, the third indication information is used to instruct the terminal device to separately perform channel measurement on the plurality of CSI-RS resources and feed back measurement information corresponding to one CSI-RS resource with best channel quality.

13. The method according to claim 8, wherein when the third indication information is a third value, the third indication information is used to instruct the terminal device to separately perform channel measurement on the plurality of CSI-RS resources and combine channel matrices obtained after estimation is performed on the plurality of CSI-RS resources.

14. The method according to claim 8, wherein each CSI-RS resource comprises quasi co-location (QCL) indication information, and the QCL indication information is used to indicate whether antenna ports in each CSI-RS resource have a similar channel large-scale property.

15. The method according to claim 14, wherein each CSI-RS resource further comprises QCL mapping port information, and the QCL mapping port information is used to indicate antenna ports that have a similar channel large-scale property.

16. A terminal device, comprising:
a transceiver, configured to receive control information sent by a network device, wherein the control information is received by way of a channel state information management setting, and the control information comprises first indication information, second indication information, and third indication information, wherein
the first indication information is used to indicate a plurality of channel state information-reference signal (CSI-RS) resources,
the second indication information is used to indicate at least one piece of the information:
beam index information of the plurality of CSI-RS resources that is sent by the network device, beam index information of the plurality of CSI-RS resources that is received by the terminal device, or beam pair information corresponding to the network device and the terminal, and
the third indication information is used to indicate a measurement method of the plurality of CSI-RS resources; and
a processor, configured to perform channel measurement on the plurality of CSI-RS resources based on the control information.

17. The terminal device according to claim 16, wherein the control information further comprises fourth indication information, and the fourth indication information is used to indicate a plurality of channel state information-interference measurement CSI-IM resources.

18. The terminal device according to claim 16, wherein the transceiver is further configured to receive the first indication information, the second indication information, and the third indication information by way of the channel state information measurement setting.

19. The terminal device according to claim 16, wherein when the third indication information is a first value, the third indication information is used to instruct the terminal device to separately perform channel measurement on the plurality of CSI-RS resources and feed back measurement information corresponding to all the CSI-RS resources.

20. The terminal device according to claim 16, wherein when the third indication information is a second value, the third indication information is used to instruct the terminal device to separately perform channel measurement on the plurality of CSI-RS resources and feed back measurement information corresponding to one CSI-RS resource with best channel quality.

* * * * *

UNITED STATES PATENT AND TRADEMARK OFFICE
CERTIFICATE OF CORRECTION

PATENT NO. : 11,147,076 B2
APPLICATION NO. : 16/504260
DATED : October 12, 2021
INVENTOR(S) : Xiaoyong Tang et al.

It is certified that error appears in the above-identified patent and that said Letters Patent is hereby corrected as shown below:

In the Specification

Column 20, Lines 63 - Column 21, Lines 10 should be replaced with:
Then, the terminal device combines channel matrices obtained after channel estimation is separately performed on the four CSI-RS resources. A combined channel matrix is as follows:

$$H = \begin{bmatrix} H_{CSI-RS1} & H_{CSI-RS2} & H_{CSI-RS3} & H_{CSI-RS4} \end{bmatrix}$$

$$= \begin{bmatrix} h_{1,1beam1} & .. & h_{1,4beam4} \\ . & & . \\ . & & . \\ h_{2,1beam1} & .. & h_{2,4beam4} \end{bmatrix}$$

Signed and Sealed this
Seventh Day of December, 2021

Drew Hirshfeld
*Performing the Functions and Duties of the
Under Secretary of Commerce for Intellectual Property and
Director of the United States Patent and Trademark Office*